US009113114B2

(12) United States Patent
Lee

(10) Patent No.: US 9,113,114 B2
(45) Date of Patent: Aug. 18, 2015

(54) APPARATUS AND METHOD FOR AUTOMATICALLY CONTROLLING IMAGE BRIGHTNESS IN IMAGE PHOTOGRAPHING DEVICE

(75) Inventor: Yong-Gu Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 777 days.

(21) Appl. No.: 13/105,512

(22) Filed: May 11, 2011

(65) Prior Publication Data

US 2011/0279710 A1 Nov. 17, 2011

(30) Foreign Application Priority Data

May 12, 2010 (KR) .......................... 10-2010-0044344
Aug. 24, 2010 (KR) .......................... 10-2010-0082062
Apr. 26, 2011 (KR) .......................... 10-2011-0039108

(51) Int. Cl.
*H04N 9/68* (2006.01)
*H04N 5/225* (2006.01)
*H04N 9/64* (2006.01)
*H04N 5/235* (2006.01)
*H04N 5/243* (2006.01)

(52) U.S. Cl.
CPC ............. *H04N 9/643* (2013.01); *H04N 5/2351* (2013.01); *H04N 5/2352* (2013.01); *H04N 5/243* (2013.01)

(58) Field of Classification Search
CPC ... H04N 5/2351; H04N 5/2352; H04N 5/243; H04N 9/643
USPC ............ 348/221.1, 223.1, 234, 235, 251, 254
See application file for complete search history.

(56) References Cited

U.S. PATENT DOCUMENTS

| 7,245,335 B2 * | 7/2007 | Watanabe ....................... 349/64 |
| 2002/0006283 A1 * | 1/2002 | Mori et al. ..................... 396/429 |
| 2007/0285552 A1 * | 12/2007 | Kim ............................... 348/335 |
| 2008/0219586 A1 * | 9/2008 | Watanabe et al. ............. 382/274 |

* cited by examiner

*Primary Examiner* — Trung Diep
(74) *Attorney, Agent, or Firm* — The Farrell Law Firm, P.C.

(57) ABSTRACT

A method for automatically controlling image brightness in an image photographing device by calculating a histogram for an image; obtaining a brightness average for the histogram; determining if a number of pixels of a histogram distribution within a first range and a number of pixels of a histogram distribution within a second range are included within a preset range; and when the number of pixels of the histogram distribution within the first range and the number of pixels of the histogram distribution within the second range are included within the preset range, as a result of a determination, adjusting the brightness average to be a reference brightness.

20 Claims, 19 Drawing Sheets

| 11 | 12 | 13 | 14 | 15 | .. | .. | 1N |
| --- | --- | --- | --- | --- | --- | --- | --- |
| 12 | 22 | 23 | 24 | 25 | .. | .. | 2N |
| 31 | 32 | 33 | 34 | 35 | .. | .. | 3N |
| 44 | 42 | 43 | 44 | 45 | .. | .. | 4N |
| .. | .. | .. | .. | .. | .. | .. | .. |
| .. | .. | .. | .. | .. | .. | .. | .. |
| M1 | M2 | M3 | M4 | M5 | .. | .. | MN |

| $W_{11}$ | $W_{12}$ | $W_{13}$ | $W_{14}$ | $W_{15}$ | .. | .. | $W_{1N}$ |
|---|---|---|---|---|---|---|---|
| $W_{21}$ | $W_{22}$ | $W_{23}$ | $W_{24}$ | $W_{25}$ | .. | .. | $W_{2N}$ |
| $W_{31}$ | $W_{32}$ | $W_{33}$ | $W_{34}$ | $W_{35}$ | .. | .. | $W_{3N}$ |
| $W_{41}$ | $W_{42}$ | $W_{43}$ | $W_{44}$ | $W_{45}$ | .. | .. | $W_{4N}$ |
| .. | .. | .. | .. | .. | .. | .. | .. |
| .. | .. | .. | .. | .. | .. | .. | .. |
| $W_{M1}$ | $W_{M2}$ | $W_{M3}$ | $W_{M4}$ | $W_{M5}$ | .. | .. | $W_{MN}$ |

| $Y_{11}$ | $Y_{12}$ | $Y_{13}$ | $Y_{14}$ | $Y_{15}$ | .. | .. | $Y_{1N}$ |
|---|---|---|---|---|---|---|---|
| $Y_{21}$ | $Y_{22}$ | $Y_{23}$ | $Y_{24}$ | $Y_{25}$ | .. | .. | $Y_{2N}$ |
| $Y_{31}$ | $Y_{32}$ | $Y_{33}$ | $Y_{34}$ | $Y_{35}$ | .. | .. | $Y_{3N}$ |
| $Y_{41}$ | $Y_{42}$ | $Y_{43}$ | $Y_{44}$ | $Y_{45}$ | .. | .. | $Y_{4N}$ |
| .. | .. | .. | .. | .. | .. | .. | .. |
| .. | .. | .. | .. | .. | .. | .. | .. |
| $Y_{M1}$ | $Y_{M2}$ | $Y_{M3}$ | $Y_{M4}$ | $Y_{M5}$ | .. | .. | $Y_{MN}$ |

FIG.5A

| $L_{11}$ | $L_{12}$ | $L_{13}$ | $L_{14}$ | $L_{15}$ | .. | .. | $L_{1T}$ |
|---|---|---|---|---|---|---|---|
| $L_{21}$ | $L_{22}$ | $L_{23}$ | $L_{24}$ | $L_{25}$ | .. | .. | $L_{2T}$ |
| $L_{31}$ | $L_{32}$ | $L_{33}$ | $L_{34}$ | $L_{35}$ | .. | .. | $L_{3T}$ |
| $L_{41}$ | $L_{42}$ | $L_{43}$ | $L_{44}$ | $L_{45}$ | .. | .. | $L_{4T}$ |
| .. | .. | .. | .. | .. | .. | .. | .. |
| .. | .. | .. | .. | .. | .. | .. | .. |
| $L_{81}$ | $L_{82}$ | $L_{83}$ | $L_{84}$ | $L_{85}$ | .. | .. | $L_{8T}$ |

| $H_{11}$ | $H_{12}$ | $H_{13}$ | $H_{14}$ | $H_{15}$ | .. | .. | $H_{1T}$ |
|---|---|---|---|---|---|---|---|
| $H_{21}$ | $H_{22}$ | $H_{23}$ | $H_{24}$ | $H_{25}$ | .. | .. | $H_{2T}$ |
| $H_{31}$ | $H_{32}$ | $H_{33}$ | $H_{34}$ | $H_{35}$ | .. | .. | $H_{3T}$ |
| $H_{41}$ | $H_{42}$ | $H_{43}$ | $H_{44}$ | $H_{45}$ | .. | .. | $H_{4T}$ |
| .. | .. | .. | .. | .. | .. | .. | .. |
| .. | .. | .. | .. | .. | .. | .. | .. |
| $H_{81}$ | $H_{82}$ | $H_{83}$ | $H_{84}$ | $H_{85}$ | .. | .. | $H_{8T}$ |

APPARATUS AND METHOD FOR AUTOMATICALLY CONTROLLING IMAGE BRIGHTNESS IN IMAGE PHOTOGRAPHING DEVICE

PRIORITY

This application claims priority under 35 U.S.C. §119(a) to applications filed in the Korean Industrial Property Office on May 12, 2010, Aug. 24, 2010, and Apr. 26, 2011, and assigned Serial Nos. 10-2010-0044344, 10-2010-0082062, and 10-2011-0039108, respectively, the disclosures of which are incorporated herein by reference.

BACKGROUND OF THE INVENTION

1. Field of the Invention

The present invention relates generally to an apparatus and a method for controlling image brightness in an image photographing device, and more particularly to an apparatus and a method for automatically controlling image brightness of an image photographing device.

2. Description of the Related Art

Recently, due to the rapid development of display devices, the development of image photographing devices having image sensors, such as cameras and a camcorders, has been accelerated. The image photographing devices can photograph an image and record the photographed image in a recording medium, and simultaneously reproduce the image at any time. Accordingly, as the number of users of image photographing devices has increased, the demand for more functionality in the image photographing device has also increased, specifically for high capability and multi-function in addition to a compact size, a reduced weight, and lower power consumption of the image photographing device.

The basic image photographing device has automatic functions, such as an Auto White Balance (AWB) function for adjusting a balance of colors of an image and an auto focusing function for automatically controlling a focus. In addition to the automatic functions, a control of image brightness in the image photographing device is taken into account. In order to control the image to have a desired brightness in the image photographing device, an exposure time and an analogue gain are adjusted and provided in the image sensor. The brightness control scheme generally works by adjusting the open/close quantity of an iris, a control quantity of a shutter, and an automatic gain control quantity, measuring the feedback brightness data, and then controlling the brightness until desired brightness data is output.

As described above, only the brightness data, i.e. Y data, is conventionally used in order to control the image brightness in the image photographing device, so that saturation of an image and the dark photographing effect when photographing an image in a particular environment are generated. For example, when a digital camera using a Complimentary Metal Oxide Semiconductor (CMOS) image sensor photographs an object, such as a fluorescent lamp with a large quantity of light, a ghost image may be generated due to the saturation of the image signal. Therefore, a method capable of preventing saturation and dark photographing generated in using the brightness data and simultaneously auto-controlling the brightness regardless of a characteristic of the image sensor is in demand. Further, by controlling the brightness by complexly using R, G, and B data, it is possible to achieve an effect of adjusting a color balance, and thus performance improvement of the AWB function may be expected.

SUMMARY OF THE INVENTION

Accordingly, an aspect of the present invention is to address at least the above-stated problems occurring in the prior art, and to provide at least the advantages described below. Accordingly, an aspect of the present invention is to provide an apparatus and a method for automatically controlling image brightness in an image photographing device.

Another aspect of the present invention is to provide an apparatus and a method for preventing the saturation and the dark photographing effect regardless of the characteristic of the image sensor.

Further, the present invention provides an apparatus and a method for improving a quality of an image by automatically maintaining image brightness within a preset range of the brightness in an image photographing device.

In accordance with an aspect of the present invention, there is provided a method for automatically controlling image brightness in an image photographing device by calculating a histogram for an image; obtaining a brightness average for the histogram by using the histogram calculation; determining if a number of pixels of a histogram distribution within a first range and a number of pixels of a histogram distribution within a second range are included within a preset range; and when the number of pixels of the histogram distribution within the first range and the number of pixels of the histogram distribution within the second range are included within the preset range, as a result of a determination, adjusting the brightness average to be a reference brightness.

In accordance with another aspect of the present invention, there is provided a image photographing apparatus for automatically controlling a brightness, the image photographing apparatus including an image sensor for receiving an image; a histogram calculator for calculating a histogram for the image received from the image sensor, obtaining a brightness average for the histogram by using the histogram calculation, and determining if a number of pixels of a histogram distribution within a first range and a number of pixels of a histogram distribution within a second range are included within a preset range; and an auto brightness controller for adjusting the brightness average to be a reference brightness when the number of pixels of the histogram distribution within the first range and the number of pixels of the histogram distribution within the second range are included within the preset range, as a result of a determination.

BRIEF DESCRIPTION OF THE DRAWINGS

The above and other aspects, features and advantages of the present invention will be more apparent from the following detailed description taken in conjunction with the accompanying drawings, in which:

FIGS. 4A and 4B are diagrams illustrating a method for obtaining a brightness average by using each window of FIG. 3;

FIGS. 5A and 5B are diagrams illustrating a method for obtaining a weighted histogram by using each window of FIG. 3;

DETAILED DESCRIPTION OF THE EMBODIMENTS OF THE PRESENT INVENTION

Figure 1:
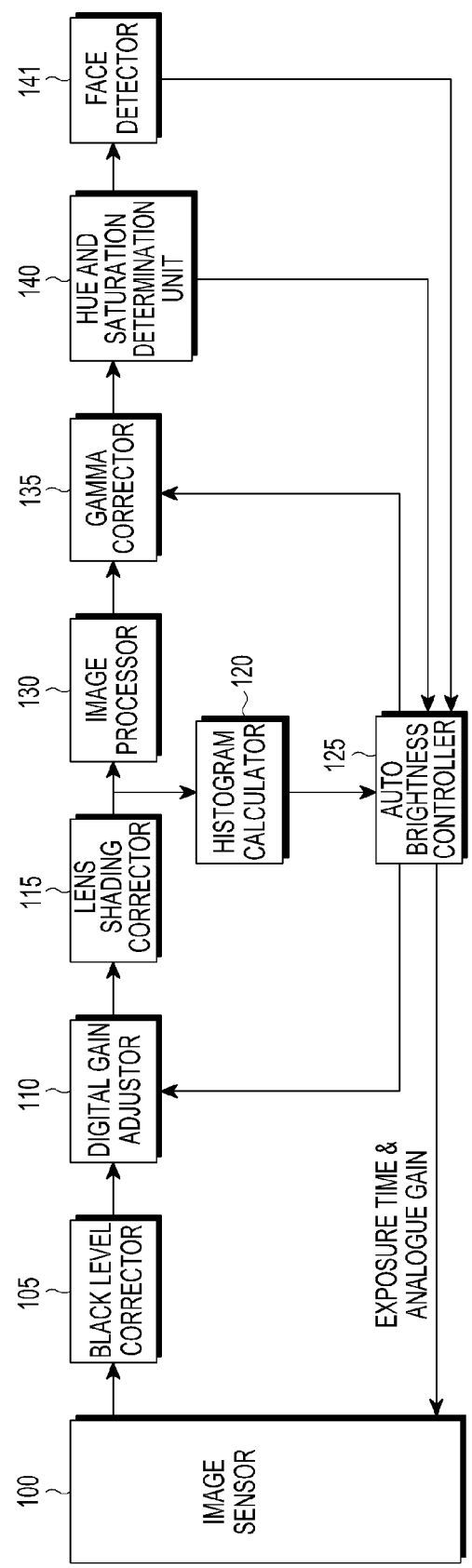
FIG. 1 is a block diagram illustrating an inside of an image photographing device according to an embodiment of the present invention.

Various embodiments of the present invention will be described below in detail with reference to the accompanying drawings. In the following description, the same elements will be designated by the same reference numerals although they are shown in different drawings. In the following description, a detailed explanation of known related functions and constitutions may be omitted to avoid unnecessarily obscuring the subject matter of the present invention. Therefore, it should be apparent to those skilled in the art that various changes and modifications of the embodiments described herein can be made without departing from the scope and spirit of the invention.

FIG. 1 is a block diagram illustrating an inside of an image photographing device according to an embodiment of the present invention. The image photographing device includes a camera, a camcorder, a web camera, a surveillance camera, a medical camera, a high-speed camera, and a multi camera, such as a 3D camera.

Referring to FIG. 1, an image sensor 100 photographs an object through a lens and outputs an image signal based on the photographed object frame by frame. A type of the image sensor 100 includes a Complimentary Metal Oxide Semiconductor (CMOS) sensor, a Charge Coupled Device (CCD) sensor, a foveon sensor, a complementary image sensor, etc.

A black level corrector 105 functions to correct a black level of an image. A digital gain adjustor 110 adjusts a digital gain so as to adjust the AWB under a control of an auto brightness controller 125. The black level corrector 105 and the digital gain adjustor 110.

Figures 2, 3:
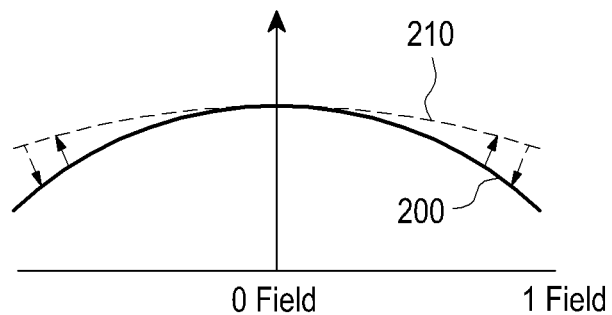
FIG. 2 is a diagram illustrating a method of a lens shading correction according to an embodiment of the present invention.
FIG. 3 is a diagram illustrating a division of an image into M×N windows according to an embodiment of the present invention.

A lens shading corrector 115 corrects a lens shading based on a predetermined shading correction curve when a peripheral area of an image is darker than a central area of an image according to a characteristic of the image sensor 100. The lens shading corrector 115 selects an inclination of the shading correction curve for the brightness correction according to a monochromic degree. Referring to FIG. 2, through increasing or decreasing an inclination of the lens shading correction curve, it is possible to make an image have a corrected brightness, instead of the original brightness. In order to appropriately compensate for the brightness of an entire image, the shading correction curve has a shape of a downward-convex curve 200 in which the compensation value increases as it approaches a peripheral area of an image. However, if the difference between the brightness of the central area and the peripheral area of the image is small, the shading correction curve has a curve 210 in which a compensation value decreases as it approaches a peripheral area of an image.

A histogram calculator 120 divides an image input frame by frame into multiple windows and calculates a brightness average of the image, a weighted histogram of the image, and a histogram bin by using brightness data for each window and a weight for each window. At this time, an entire image may be used for the histogram or a part of the image may be used through a resizing scheme, such as a sub-sampling, for the histogram.

For example, after the histogram calculator 120 divides a single image 300 into M×N windows as illustrated in FIG. 3, it is possible to obtain a brightness average $Y_A$ of the image by using a weight $W_{ij}$ for each window, i.e. an Auto Exposure (AE) weight for each window, as illustrated in FIG. 4A and brightness data ($Y_{ij}$) for each window as illustrated in FIG. 4B, which is expressed by Equation (1) below.

$$Y_A = \Sigma W_{ij} Y_{ij} / \Sigma W_{ij} \quad (1)$$

In Equation (1), i refers to a row and j refers to a column.

When the histogram calculator 120 obtains the brightness average $Y_A$ through Equation (1), it provides the auto brightness controller 125 with the obtained brightness average $Y_A$.

Figure 6A:
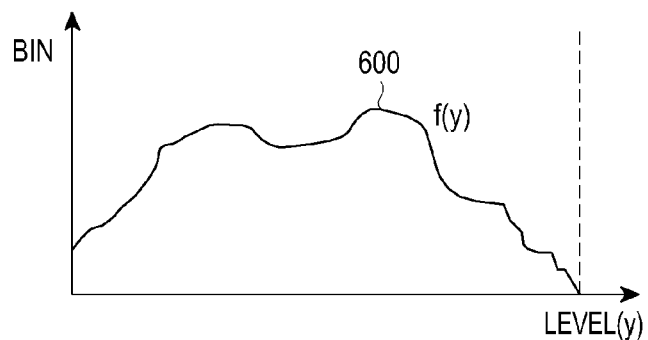
FIGS. 6A to 6C are diagrams illustrating Y histograms according to an embodiment of the present invention.

Here, the histogram is illustrated as FIG. 6A. In FIG. 6A, when an image has 8 bits, a horizontal axis may use brightness information Y, red pixel brightness R, green pixel brightness G, and blue pixel brightness B, and indicates a statistical quantity (Max (R, G, B)) of R, G, and B, etc., as level y from zero to 255, and a vertical axis indicates a bin corresponding to the level y. Function f(y) 600 in FIG. 6A is a weighted histogram of the entire window and may be obtained through Equation (2) below.

$$f(y) = \frac{\sum_{ij} L_{ij} H_{ij}}{\sum_{ij} L_{ij}} \quad (2)$$

In Equation (2), $L_{ij}$ refers to a histogram weight for each window illustrated in FIG. 5A, and $H_{ij}$ refers to a histogram bin for each window illustrated in FIG. 5B. In Equation (2), f(y) refers to a sum of the histogram bins in which a weight is applied to each window. Further, the histogram bin $H_{ij}$ of an image is obtained according to the level y. However, in the case of the red, green, and blue histogram, the histogram bin $H_{ij}$ is obtained by converting y to K×y with adaptive application of constants α, β, and γ according to the necessity, wherein K is α, β, and γ.

The histogram calculator 120 sets the multiple windows in the image as illustrated in FIG. 3, sets a histogram weight for each window as illustrated in FIG. 5A, and obtains a histogram bin by using the defined window as illustrated in FIG. 5B. In this event, when the image sensor 100 is an RGB Bayer sensor, a histogram for a brightness level of red, green, and blue may be used as well as the histogram for the brightness data Y illustrated in FIG. 6A. Further, if the image sensor 100 is a WRGB sensor, a W, R, G, B, and Y histogram may be used. Further, in addition to the weighted histogram, various histograms using the brightness level of RGB, such as including Max($A*R_{ij}$, $B*G_{ij}$, $C*B_{ij}$) and Median($A*R_{ij}$, $B*G_{ij}$, $C*B_{ij}$), serving as an entire statistical histogram are used in every window.

As such, the histogram extracted based on the type of the image sensor 100 can be obtained with various methods. Here, A, B, and C are constants and may be used with adaptively application of the gain.

Specifically, the histogram calculator 120 may use (A*Red+B*Green+C*Blue) histogram, (A*Red+B*Green+C*Blue) histogram, (A*Cyan+B*Magenta+C*Yellow) histogram, (A*Cyan+B*Magenta+C*Yellow+D*Green) histogram, Median($A*R_{ij}$, $B*G_{ij}$, $C*B_{ij}$) histogram, etc. in addition to the Y histogram of FIG. 6, wherein A, B, C, and D are user-defined constants.

Figure 7:
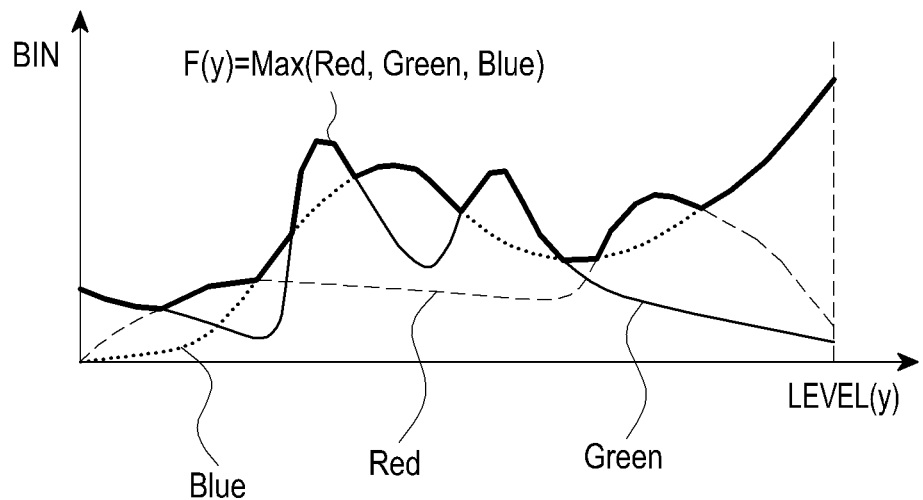
FIG. 7 is a Max(A*Rij, B*Gij, C*Bij) histogram according to an embodiment of the present invention.

Among the histograms, FIG. 7 illustrates an example of the Max($A*R_{ij}$, $B*G_{ij}$, $C*B_{ij}$) histogram. In FIG. 7, f(y)=Max(R, G, B) and is a histogram in which the maximal value is selected for each level among the R histogram, the G histogram, and B histogram.

Figure 8:
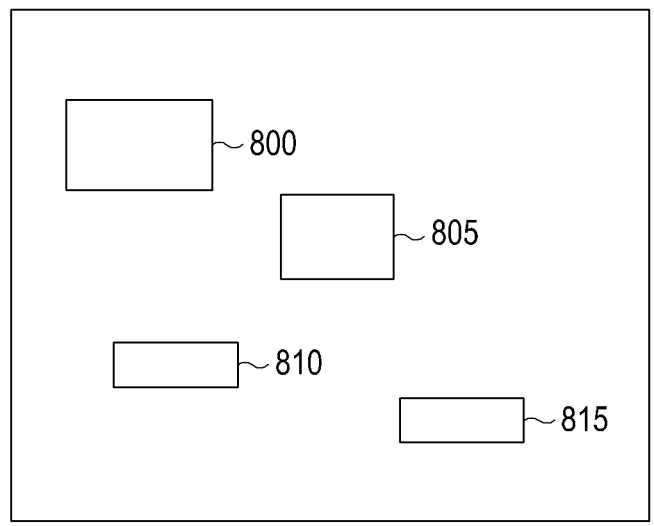
FIG. 8 is a block diagram illustrating another type of a window according to an embodiment of the present invention.

Further, in FIG. 3, the M×N number of windows and a start point and an end point of the image may be defined by a user. In FIG. 3, the image is divided into multiple windows having the same shape as an example, but as illustrated in FIG. 8, the desired number of windows 800 through 815 positioned at a predetermined position may be defined according to the necessity of a user, and the windows may overlap.

The auto brightness controller 125 adjusts an exposure time, analogue gain, and digital gain so that the brightness average $Y_A$ becomes identical to a reference brightness (Y target) $Y_T$. The auto brightness controller 125 functions as a controller for controlling a general operation of the image photographing device.

Even though the brightness average ($Y_A$) is constantly maintained in the reference brightness (Y target), but there is no pixel corresponding to a preset brightness level or higher within the image, the image may be generally output darkly. However, if there are too many pixels corresponding to a preset brightness level or higher, the image may be generally output too brightly.

Figures 6B, 6C:
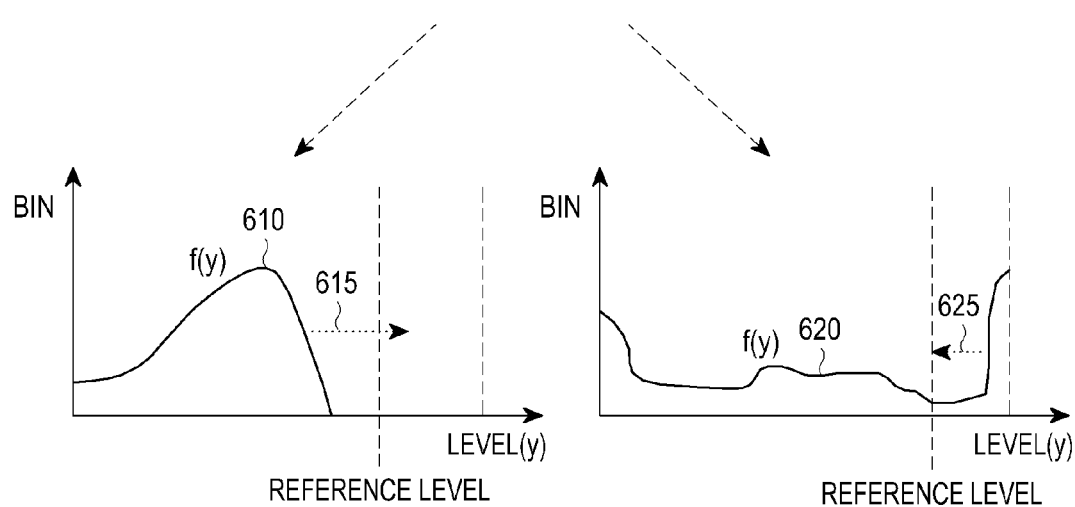

For example, FIG. 6B illustrates an example of the histogram in which a right area is vacant in comparison with the reference level, wherein the histogram is a histogram with an insufficient high key, so that the image is generally output darkly. Here, if the weighted histogram f(y) 610 is adjusted so that it moves in direction 615, the image may be generally output more brightly. Further, FIG. 6C illustrates an example of a histogram, which has a large number of high keys including a large number of pixels corresponding to a saturation level in comparison with the reference level to generate saturation. As such, when there is a large number of pixels corresponding to the saturation level, the saturation of the image may be generated. Here, the saturation means a time when a pixel with a predetermined ratio has at least a predetermined brightness level in an entire image. An image with every sufficient grayscale generally has a widely distributed histogram as illustrated in FIG. 6A, but in FIG. 6C, the histogram is largely distributed in a right area, so that the image grayscale is insufficiently displayed. If the weighted histogram f(y) 620 having the distribution biased to the right is adjusted to move in direction 625, the image will be corrected to an image having every sufficient grayscale.

At this time, in FIGS. 6A to 6C illustrating the examples of the histograms of the image, the level y of the horizontal axis may be replaced with brightness data Y, red pixel brightness R, green pixel brightness G, and blue pixel brightness B. Further, brightness R, brightness G, brightness B, the statistical quantity Max($RH_{ij}$, $GH_{ij}$, $BH_{ij}$), etc. may be used for the histogram bin.

As described above, even if the auto brightness controller 125 constantly maintains the brightness average $Y_A$ in the reference brightness (Y target), the histogram may have the distribution as illustrated in FIGS. 6B and 6C. In order to prevent such a histogram distribution, the present invention suggests an auto brightness control method. The auto brightness control method using the histogram will be specifically described below.

An image processor 130 performs an image processing for an image signal including red, green, and blue.

Figure 9:
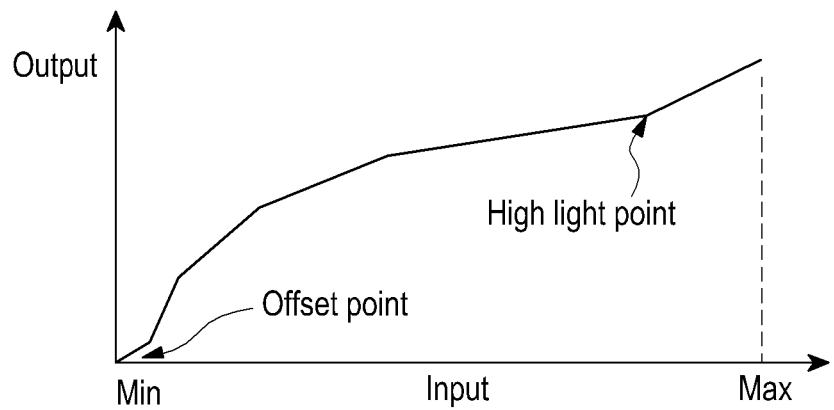
FIG. 9 is a graph illustrating a gamma correction method according to an embodiment of the present invention.

A gamma corrector 135 performs a gamma correction of an image. The gamma is generally a measure indicating a contrast state and refers to an inclination degree of a property curve, i.e. a change of a density/exposure quantity. The gamma corrector 135 according to the present invention can change an offset point and a highlight point according to a histogram distribution. For example, in FIG. 9, by changing the offset point, it is possible to reduce a section in which an image is hazy, and by changing the highlight point, it is also possible to reduce a section in which the image is excessively bright. Here, the conversion of the gamma correction may be independently defined by a user. If the gamma correction is used together with a Wide Dynamic Range (WDR)/High Dynamic Range (HDR) using a global tone mapping or a local tone mapping, it is possible to further improve an image dynamic range.

A hue/saturation determination unit 140 determines a gray ratio and a monochrome property of an image. At this time, an entire image or a resizing scheme, such as a sub-sampling may be used for the determination according to a necessity. The hue/saturation determination unit 140 uses a graph of the relation between the hue and the saturation illustrated in FIGS. 10 and 11 in order to determine a gray ratio and a monochrome property of an image.

By additionally using the functionality of a face detector 141, etc. in processing the image, it is possible to use a face detection result for brightness control.

Figure 10:
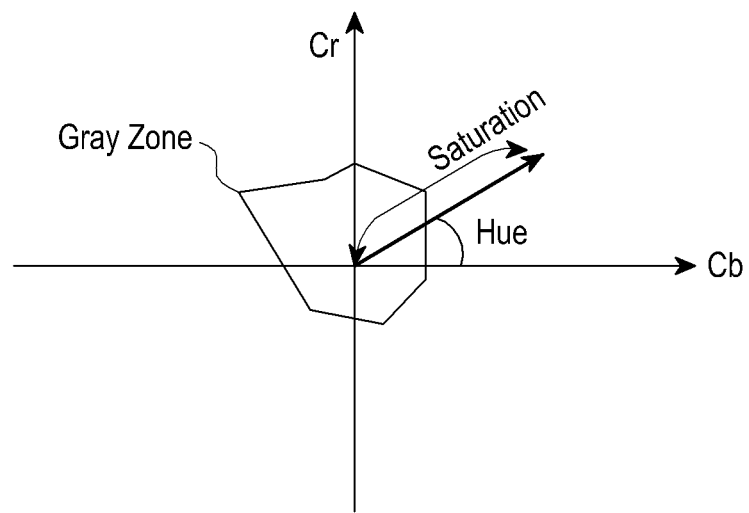
FIGS. 10, and 11A to 11C are graphs illustrating a relation between hue and saturation used in the present invention.
Figure 11A:
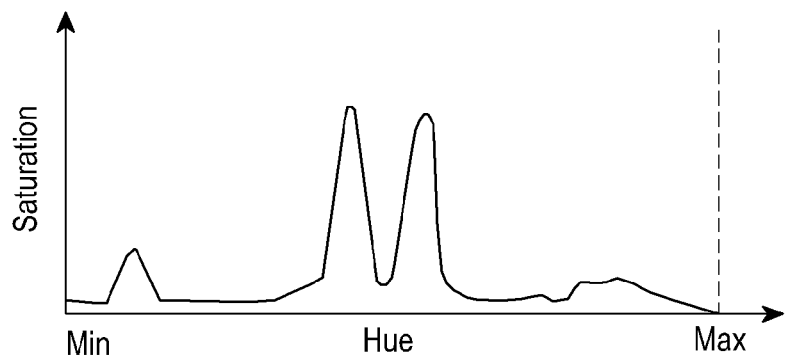
Figure 11B:
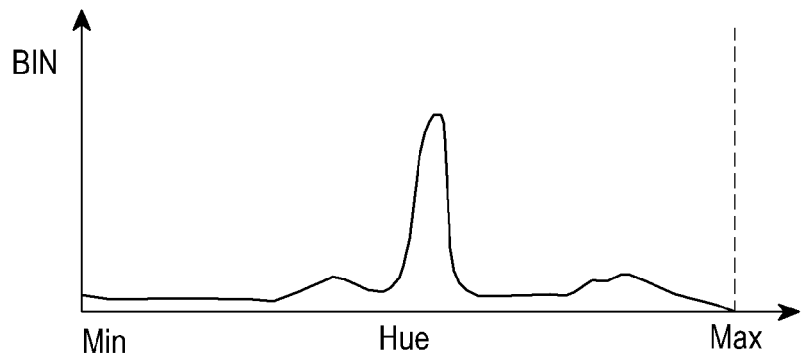
Figure 11C:
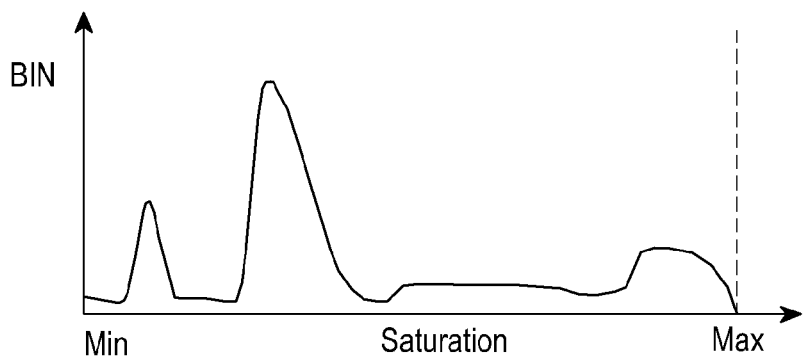

In particular, the hue/saturation determination unit 140 may obtain a saturation according to a hue as illustrated in FIG. 11A, a bin of a hue as illustrated in FIG. 11B, and a bin of a saturation as illustrated in FIG. 11C for use. Further, the hue/saturation determination unit 140 determines the gray ratio of an image by using FIG. 10. If FIG. 10 is used in defining a ratio (%) of the number of bins of the gray pixel within the image with respect to the total number of bins of the image, it is possible to recognize a ratio of the gray pixel. For example, a central area represents gray in FIG. 10, so that as a large number of pixels is distributed in the central area, the image generally has many colors of a black series.

Here, for the bin of the gray pixel, a gray pixel in a range of Ymin≤Y≤Ymax in a CbCr Plane of a YcBCr color space may be considered, or only a pixel satisfying a gray zone of FIG.

Figure 12A:
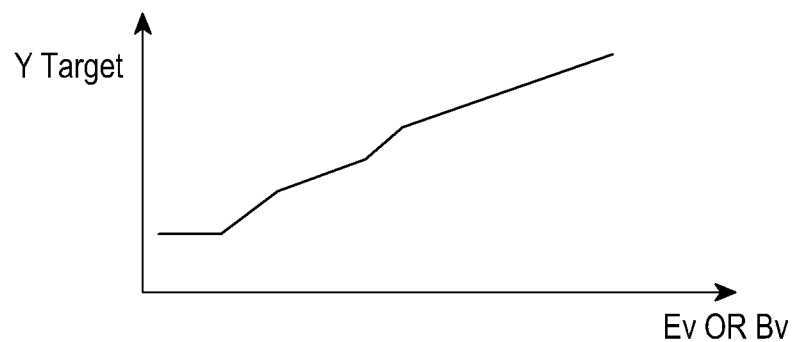
FIGS. 12A to 12B are graphs illustrating examples of change of a reference brightness according to an exposure control quantity (Ev) or a gray pixel according to an embodiment of the present invention.
Figure 12B:
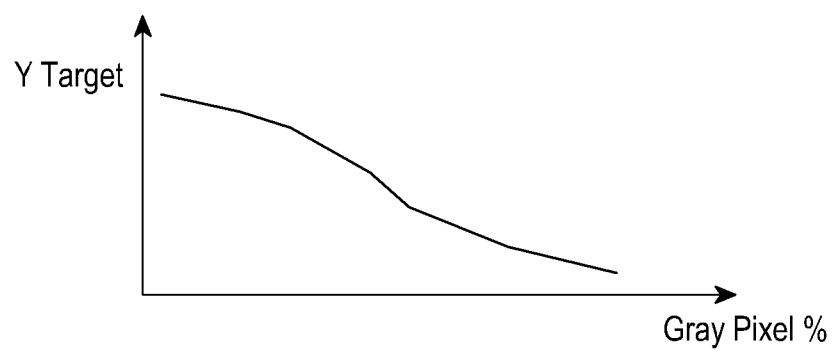

10 may be considered by taking the weight illustrated in FIG. 12 into account. Here, it is possible to change the reference brightness (Y target) according to the monochrome degree as illustrated in FIGS. 12A and 12B.

FIG. 12A illustrates an example of the change of the reference brightness (Y target) according to an exposure control quantity (Ev), and FIG. 12B illustrates an example of the change of the reference brightness (Y target) according to the gray pixel. As a value of the exposure control quantity (Ev) increases, an exposure quantity decreases so that the image becomes darker. In contrast, as a value of the exposure control quantity (Ev) is smaller, an exposure quantity increases, so that the image becomes brighter. Therefore, by changing the reference brightness (Y target) according to the exposure control quantity as illustrated in FIG. 12A, an image processed to be more white is output in the event of a white image in a bright place, and an image processed to be darker is output in the event of a white image in a dark place. Similarly, by changing the reference brightness (Y target) according to the gray pixel as illustrated in FIG. 12B, an image processed to be more black is output in the event of the black image.

Further, through linking with a face detection algorithm of the face detector 141 of FIG. 1, if a face is detected, it is possible to change an image brightness in accordance with a taste of a camera user by changing the reference brightness (Y target), and the $Y_{LOWER}$ and the $Y_{UPPER}$. If a face is not detected, it returns to the reference brightness (Y target), and an initial value of the $Y_{LOWER}$ and the $Y_{UPPER}$, or the reference brightness (Y target), and the last value of the $Y_{LOWER}$ and the $Y_{UPPER}$ before the face is detected.

Hereinafter, a process for automatically controlling image brightness in the image photographing device will be described with reference to FIGS. 13A and 13B. In accordance with an embodiment of the present invention, a sum f(y) of the histogram bins in which a weight is applied to each window is used for the automatic brightness control.

Figure 13A:
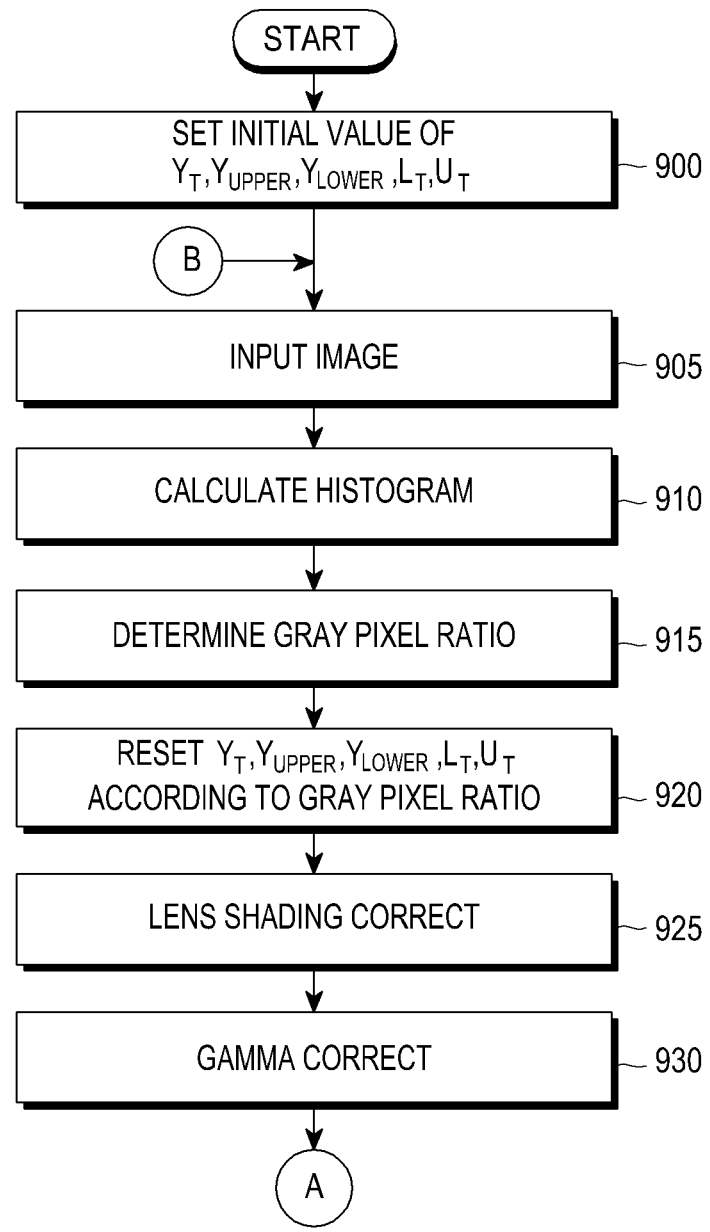
FIGS. 13A to 13B are flowcharts illustrating an operation of an automatic brightness control according to an embodiment of the present invention.

Referring to FIG. 13A, in step 900, the image photographing device sets an initial value for each of a reference brightness $Y_T$, an upper limit brightness variable $Y_{UPPER}$, a lower limit brightness variable $Y_{LOWER}$, the number $L_T$ of lower limit brightness pixels, and the number $U_T$ of upper limit brightness pixels. When an image is input in step 905, a histogram for the image is calculated in step 910. Hereinafter, the Y histogram of FIG. 6 is used as an example for description, but the present invention is not limited thereto. That is, various histograms may be obtained according to the type of image sensor 100. For example, any one of (A*Red+ B*Green+C*Blue) histogram, (A*Red+B*Green+C*Blue+ D*white) histogram, (A*Cyan+B*Magenta+C*Yellow) histogram, (A*Cyan+B*Magenta+C*Yellow+D*Green) histogram, Max($A*R_{ij}, B*G_{ij}, C*B_{ij}$) histogram, and Median ($A*R_{ij}, B*G_{ij}, C*B_{ij}$) histogram may be calculated.

Further, prior to calculating the histogram, it may calculate the brightness average $Y_A$ as shown above in Equation (1). If the histogram is calculated instead of the brightness average $Y_A$, it is possible to obtain a brightness average $Y_H$ for the histogram by using the calculated histogram. The brightness average $Y_H$ may be obtained through Equation (3).

$$Y_H = \int_0^m y \times f(y) dy \quad (3)$$

In Equation (3), y refers to a level and f(y) refers to a sum of histogram bins in which a weight is applied to each window. As such, the brightness average $Y_A$ and the brightness average $Y_H$ are used for the auto brightness control. That is, through making the brightness average $Y_A$ or the brightness average $Y_H$ be the reference brightness $Y_T$, the auto brightness control is performed. In the present invention, in addition to using the method of using the brightness average $Y_A$ or the brightness average $Y_H$, a method for the auto brightness control additionally using a histogram controlling method is suggested.

In step 900, the image photographing device sets the initial value for each of the reference brightness $Y_T$, the upper limit brightness variable $Y_{UPPER}$, the lower limit brightness variable $Y_{LOWER}$, the number $L_T$ of lower limit brightness pixels, and the number $U_T$ of upper limit brightness pixels. Further, a maximum value (m) of the level may be preset within the image photographing device. Here, the number of brightness pixels will be described with reference to FIG. 14. FIG. 14 illustrates an example of a histogram distribution of pixels. In FIG. 14, the lower limit level variable is defined as l 705, the upper limit level variable is defined as u 710, and the maximum level value is defined as m 715. When it is assumed that the number of brightness pixels between the lower limit level variable l 705 and the upper limit level variable u 710 is L as illustrated in FIG. 14A, the number L of brightness pixels may be obtained through Equation (4).

$$L = \int_l^m f(y) dy \quad (4)$$

Figure 14A:
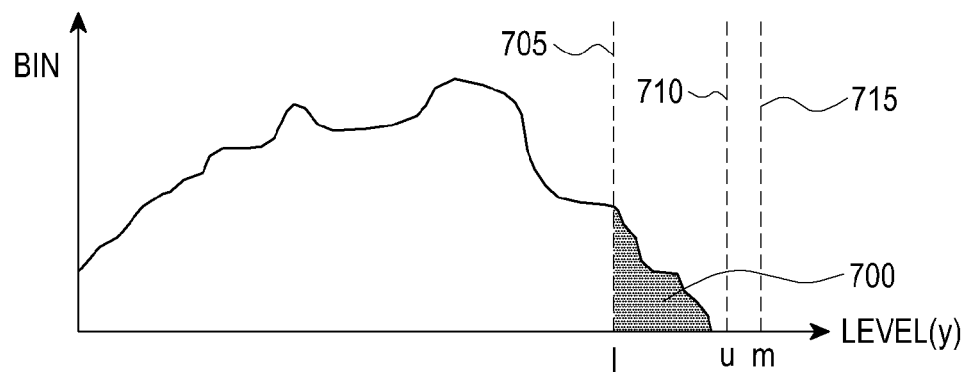
FIGS. 14A to 14B are graphs illustrating a histogram distribution of pixels according to an embodiment of the present invention.

The number L of brightness pixels defined as Equation (4) corresponds to a shaded area 700 in FIG. 14A. In the present invention, it is possible to control the brightness by adjusting the number of pixels for the histogram f(y) between the lower limit level variable l 705 and the upper limit level variable u 710 to be included in a predetermined range. For example, when it is assumed that the number of pixels for the histogram f(y) between the lower limit level variable l 705 and the upper limit level variable u 710 is 100 and at least 150 pixels are required in order to adjust the image to be bright, the number of pixels are adjusted to be 150.

Figure 14B:
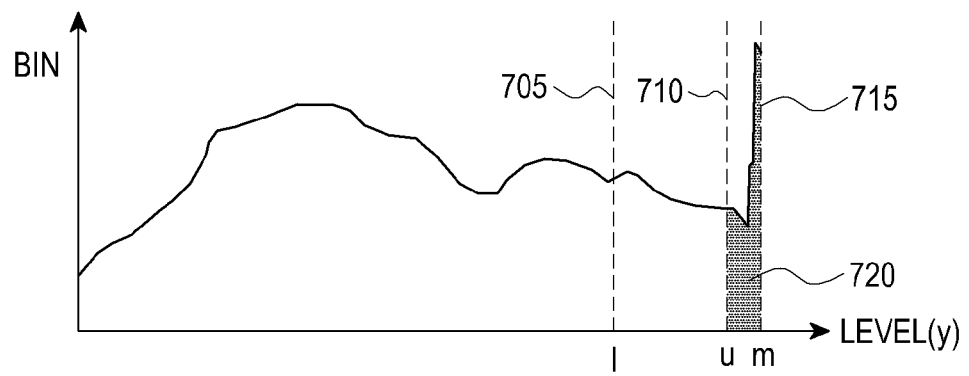

In contrast, if many pixels are gathered in an area of a high level, the histogram distribution of pixels is represented as illustrated in FIG. 14B. When it is assumed that the number of brightness pixels for the histogram between the lower limit level variable u 710 and the maximum level value m 715 is U, the number U of brightness pixels may be obtained through Equation (5) below.

$$U = \int_u^m f(y) dy \quad (5)$$

The number U of brightness pixels defined as Equation (5) corresponds to a shaded area 720 in FIG. 14B. If the number U of brightness pixels for the histogram between the lower limit level variable u 710 and the maximum level value m 715 is larger than a predetermined number, the image is displayed as excessively bright, so that the number of brightness pixels is adjusted to be a predetermined number or less.

The upper limit brightness value $Y_{UPPER}$ and the lower limit brightness variable $Y_{LOWER}$ represent the lower limit level variable l 705 and the upper limit level variable u 710. Each of the reference brightness $Y_T$, the upper limit brightness value $Y_{UPPER}$, the lower limit brightness variable $Y_{LOWER}$, the number $L_T$ of lower limit brightness pixels, and the number $U_T$ of upper limit brightness pixels may be changed. As is in the present invention, the variables may be changed by Ev or Bv, a gray pixel, etc.

Then, the image photographing device determines a ratio of the gray pixel in step 915, and resets each of the reference brightness $Y_T$, the upper limit brightness value $Y_{UPPER}$, the lower limit brightness variable $Y_{LOWER}$, the number $L_T$ of lower limit brightness pixels, and the number $U_T$ of upper limit brightness pixels according to the ratio of the gray pixel in step 920. The variables may be reset in accordance with a predetermined table value representing a mapping relation between the ratio of the gray pixel and the values of the variables. Then, the image photographing device performs a lens shading correction in step 925 and performs a gamma correction in step 930. The lens shading correction and the gamma correction are methods for improving an image quality so that they may be additionally adopted when desiring to obtain the image of the higher quality.

Figure 13B:
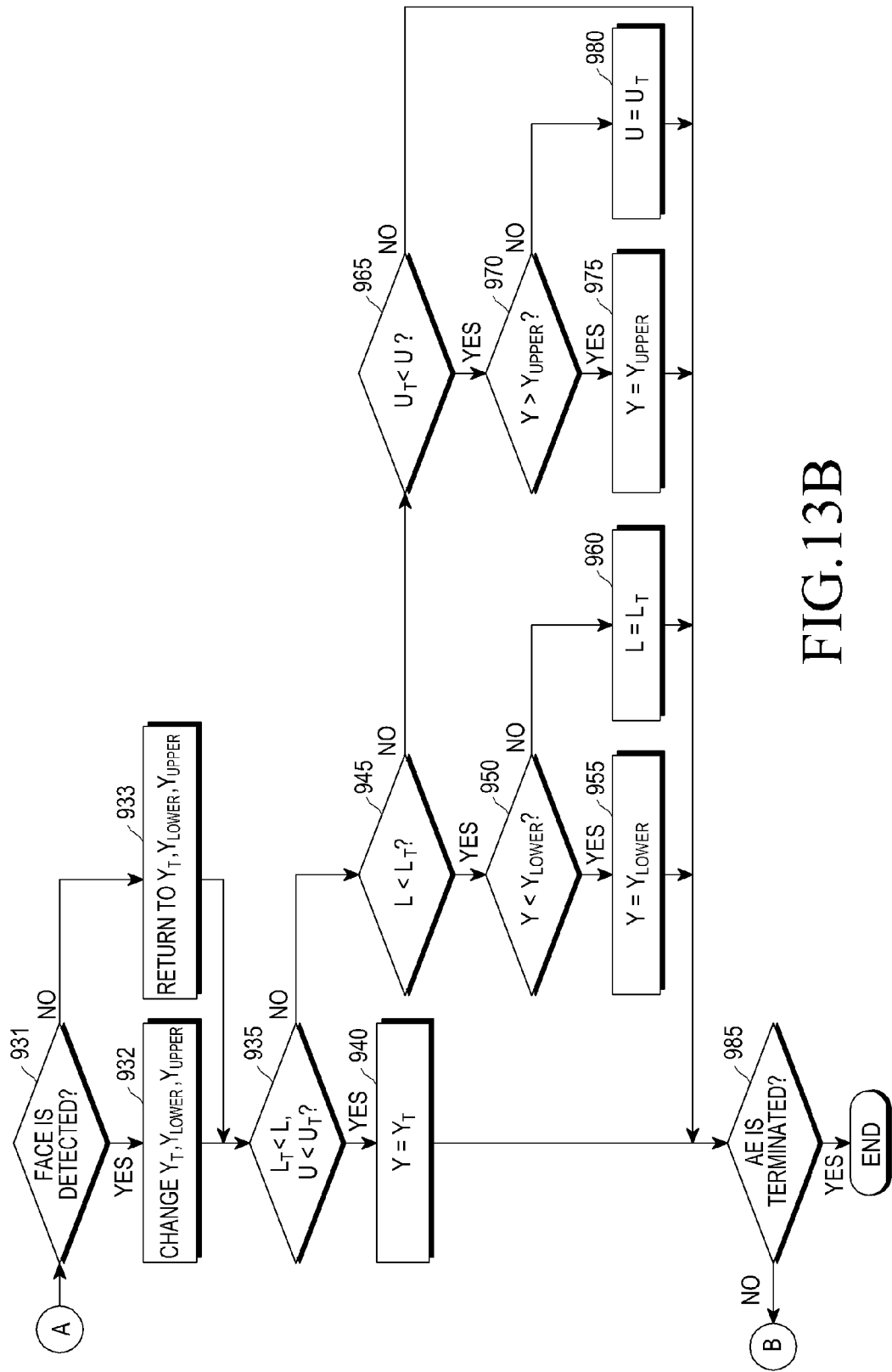

Next, the image photographing device proceeds to step 931 of FIG. 13B. Symbol A is used for indicating that step 930 of FIG. 13A is connected with step 931 of FIG. 13B. Further, symbol B is used for indicating that step 905 of FIG. 13A is connected with step 985 of FIG. 13B.

If a face is detected through the face detection algorithm in step 931, it proceeds to step 932 to change the Y target, and the $Y_{LOWER}$ and the $Y_{UPPER}$. Through this, the image brightness may be changed in accordance with a taste of a camera user. However, if a face is detected, it proceeds to step 933 to return to the Y target, and the initial value of the $Y_{LOWER}$ and the $Y_{UPPER}$, or the Y target, and the last value of the $Y_{LOWER}$ and the $Y_{UPPER}$ before the face is detected.

After obtaining the numbers L and U of brightness pixels of the histogram as Equations (4) and (5), the image photographing device determines if the number L of brightness pixels between the lower limit level variable l 705 and the maximum level value m 715 is larger than the number $L_T$ of lower limit brightness pixels and simultaneously the number U of brightness pixels between the upper limit level variable l 710 and the maximum level value m 715 is less than the number $U_T$ of upper limit brightness pixels in step 935. If the condition in step 935 is satisfied, it represents that the pixels are evenly distributed, so that the image photographing device adjusts the brightness so that the brightness average Y is to be $Y_T$ in step 940. Here, the brightness average Y refers to the brightness average $Y_A$ or the brightness average $Y_H$.

However, if the condition in step 935 is not satisfied, it is determined if the number L of brightness pixels is less than the number $L_T$ of lower limit brightness pixels in step 945. If the number L of brightness pixels is less than the number $L_T$ of lower limit brightness pixels, it is determined if the brightness average Y is less than the lower limit brightness variable $Y_{LOWER}$ in step 950. As a result of the determination, when the brightness average Y is equal to or larger than the lower limit brightness variable $Y_{LOWER}$, the image photographing device adjusts the number L of brightness pixels between the lower limit level variable l 705 and the maximum level value m 715 to be the number $L_T$ of lower limit brightness pixels. Even though the brightness average belongs to a range of a desired brightness conditions, there may occur the saturation or the phenomenon of the dark photographing, so that the number of brightness pixels is also adjusted in order to prevent the saturation or the above phenomenon. However, if the brightness average Y is less than the lower limit brightness variable $Y_{LOWER}$, it is necessary to adjust the brightness average Y to be the lowest brightness, so that the brightness average Y is adjusted to be the lower limit brightness variable $Y_{LOWER}$.

When it is determined that the number L of brightness pixels is equal to or larger than the number $L_T$ of lower limit brightness pixels in step 945, it is determined if the number U of brightness pixels is larger than the number $U_T$ of upper limit brightness pixels in step 965. When it is determined that the number U of brightness pixels is larger than the number $U_T$ of upper limit brightness pixels, it is determined if the brightness average Y is larger than the upper limit brightness value $Y_{UPPER}$ in step 970. When it is determined that the brightness average Y is larger than the upper limit brightness value $Y_{UPPER}$, the image photographing device controls so that the brightness average Y is to be the upper limit brightness value $Y_{UPPER}$ in step 975. That is, the image photographing device decreases the brightness average Y to the upper limit brightness value $Y_{UPPER}$ in order to prevent the brightness average Y from being excessively large. However, when it is determined that the brightness average Y is equal to or less than the upper limit brightness value $Y_{UPPER}$, the image photographing device controls the number U of brightness pixels to be the number $U_T$ of upper limit brightness pixels in step 980. Through operating the process, the image photographing device determines if the AE function for controlling the brightness is terminated. If the AE function is not terminated, it returns to B of FIG. 13A and repeats the aforementioned process for an image input frame by frame.

However, if the brightness average is automatically adjusted based on the predetermined upper limit value, the image may become excessively brighter than desired. In contrast, if the brightness average is automatically adjusted to the predetermined lower limit value, the excessively dark image may be output due to the backlight, etc.

In another embodiment of the present invention, the process of the auto brightness control of the image photographing device will be described taking various cases into account.

Figure 15A:
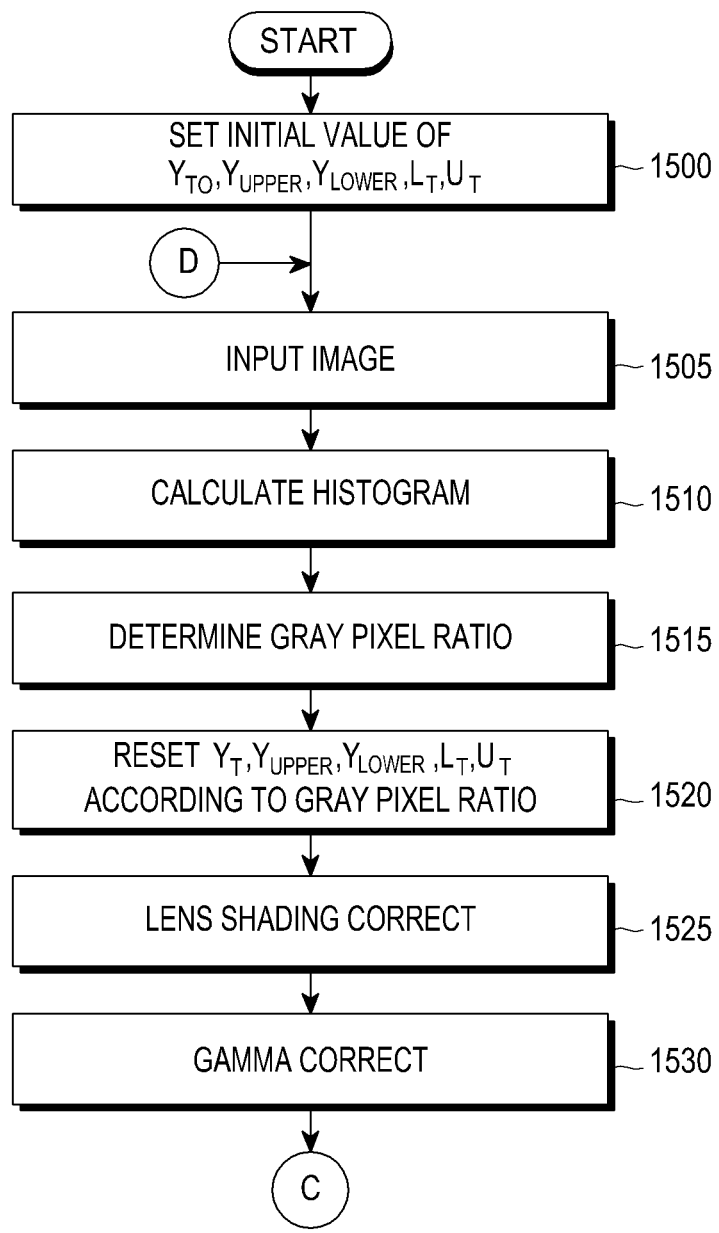
FIGS. 15A to 15B are flowcharts illustrating an operation of an automatic brightness control according to another embodiment of the present invention.

Referring to FIG. 15A, the image photographing device sets an initial value of each of a user set reference brightness $Y_{TO}$, a reference brightness $Y_T$ for control, an upper limit brightness value $Y_{UPPER}$, an lower limit brightness variable $Y_{LOWER}$, the number $U_T$ of upper limit brightness pixels, and the number $L_T$ of lower limit brightness pixels in step 1500. Here, the number $L_T$ of lower limit brightness pixels means a lower limit brightness level up to which the lower limit brightness can be maximally adjusted for the lower limit brightness and the number $U_T$ of upper limit brightness pixels means an upper limit brightness level up to which the upper limit brightness can be minimally adjusted.

Steps 1505 to 1515 are identical to steps 905 to 915 of FIG. 13A, and thus their descriptions will be omitted. However, the brightness average $Y_H$ according to another embodiment of the present invention will be obtained through Equation (6).

$$Y_H = \int_0^m y \times f(y) dy / \int_0^m f(y) dy \qquad (6)$$

In Equation (6), y refers to a level and f(y) refers to a sum of the histogram bins in which a weight is applied to each window. As such, through adjusting the brightness average $Y_A$ of Equation (1) or the brightness average $Y_H$ of Equation (6) to be the reference brightness $Y_T$, the image photographing device performs the auto brightness control. The auto brightness control additionally using the method of the control of the histogram representing the distribution of pixels is to follows.

Referring to the histogram distribution of pixels of FIG. 14A, when it is assumed that the number of brightness pixels between the lower limit level variable l 705 and the maximum level value m 715 is $L_l$, the $L_l$ may be obtained through Equation (7).

$$L_l = \int_l^m f(y) dy \qquad (7)$$

In Equation (7), the number $L_l$ of brightness pixels corresponds to a shaded area 700 in FIG. 14A. The present invention can control the brightness by adjusting the number of pixels for the histogram f(y) between the lower limit level variable l 705 and the upper limit level variable u 710 to be included within a preset range. For example, when it is assumed that the number $L_l$ of pixels for the histogram f(y) between the lower limit level variable l 705 and the upper limit level variable u 710 is 100 and at least 150 pixels are required for the increase of the brightness, the number $L_l$ of pixels is adjusted to 150 of the number $L_T$ of lower limit brightness pixels.

In contrast, when a large number of pixels is gathered in a high level area, a histogram distribution of pixels illustrated in FIG. 14B is represented. When it is assumed that the number of brightness pixels between the upper limit level variable u 710 and the maximum level value m 715 is $U_u$, the number $U_u$ of brightness pixels may be obtained through Equation (8).

$$U_u = \int_u^m f(y) dy \quad (8)$$

In Equation (8), the number $U_u$ of brightness pixels corresponds to a shaded area 720 in FIG. 14B. When the number $U_u$ of brightness pixels between the upper limit level variable u 710 and the maximum level value m 715 is equal to or larger than a predetermined number, the image is displayed as excessively bright, so that, the number of pixels is decreased below the predetermined number. For example, when it is assumed that the number $U_u$ of pixels between the upper limit level variable u 710 and the maximum level value m 715 is 200 and a maximum of 150 pixels are required for the prevention of the excessively bright image, the number $U_u$ of pixels is adjusted to 150 of the number $U_T$ of upper limit brightness pixels. In FIG. 14, the lower limit level variable l 705 and the upper limit level variable u 710 are defined as the upper limit brightness value $Y_{UPPER}$ and the lower limit brightness variable $Y_{LOWER}$, respectively, and the number $L_l$ of pixels and the number $U_u$ of pixels are adjusted based on the number $L_T$ of lower limit brightness pixels and the number $U_T$ of upper limit brightness pixels, respectively. The reference brightness $Y_T$, the upper limit brightness value $Y_{UPPER}$, the lower limit brightness variable $Y_{LOWER}$, the number $L_T$ of lower limit brightness pixels, and the number $U_T$ of the upper limit brightness pixels may be changed, and also be changed by Ev or Bv, a gray pixel, etc. as illustrated in FIG. 12.

The generalization of the concept may be expressed by Equation (9) below.

$$K_A \Leftarrow \int_0^{LE} f(y) dy / \int_0^m f(y) dy = A\% \quad (9)$$

Figure 16:
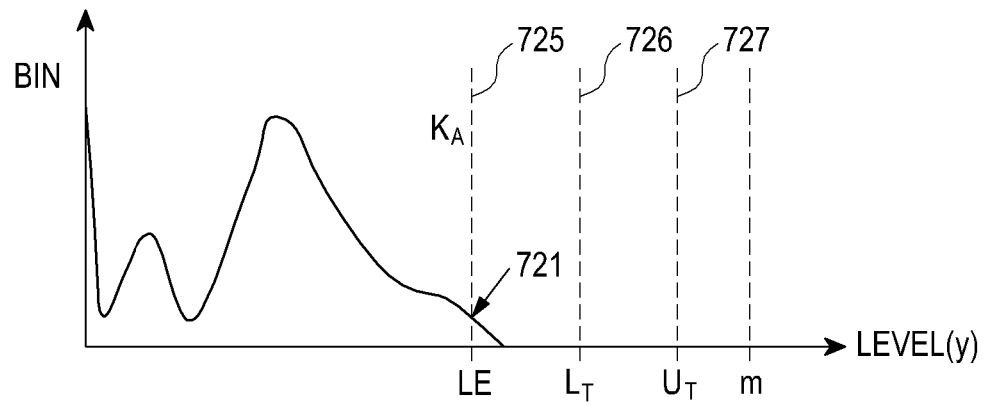
FIG. 16 is a graph illustrating a histogram distribution used in obtaining a brightness level according to another embodiment of the present invention.

Equation (9) is an equation for obtaining a brightness level LE in which the number of pixels corresponds to a proportion of A % of the number of all pixels from level 0 to level m, and Equation (9) is defined as $K_A$. Referring to FIG. 16, on an assumption that A is a predetermined value, Equation (9) obtains a brightness level LE in which the sum of the number of pixels from level 0 to the level for the histogram f(y) corresponds to A % 721 of the all pixels. As such, Equation (9) is an equation for obtaining a brightness level in which the entire number of pixels for the histogram is maintained as a preset number of pixels. $K_A$ of Equation (9) is obtained in the current histogram distribution, and it must be subjected to a normalization of Equation (10) below for using it for control.

$$K'_A = K_A \times Y_{TO}/Y_A \quad (10)$$

In Equation (10), $K_A'$ is a normalization value, $K_A$ is a histogram accumulation value, and $Y_{TO}$ is a user set reference brightness, and $Y_A$ is a brightness average.

Figure 15B:
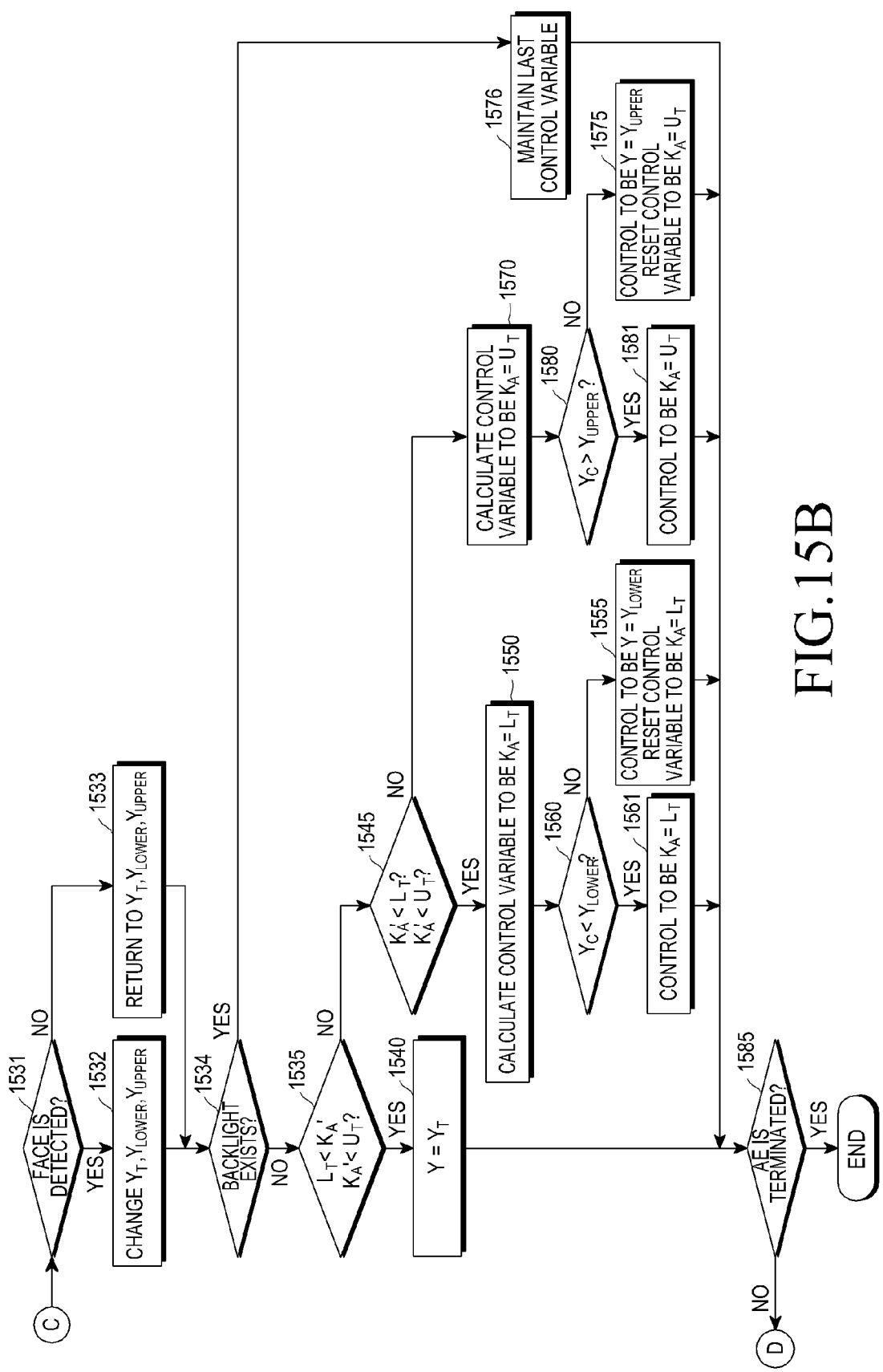

The reference brightness $Y_T$, the upper limit brightness value $Y_{UPPER}$, the lower limit brightness variable $Y_{LOWER}$, the number $L_T$ of lower limit brightness pixels, and the number $U_T$ of upper limit brightness pixels are set, respectively, in accordance with a ratio of a gray pixel in step 1520. Next, steps 1525 and 1530 are identical to steps 925 and 935 of FIG. 13A. Symbol C is used for indicating that step 1530 of FIG. 15A is connected with step 1531 of FIG. 15B. Further, symbol D is used for indicating that step 1505 of FIG. 15A is connected with step 1585 of FIG. 15B. Further, steps 1531 and 1533 of FIG. 15B are identical to steps 931 and 933 of FIG. 13B.

Figure 17:
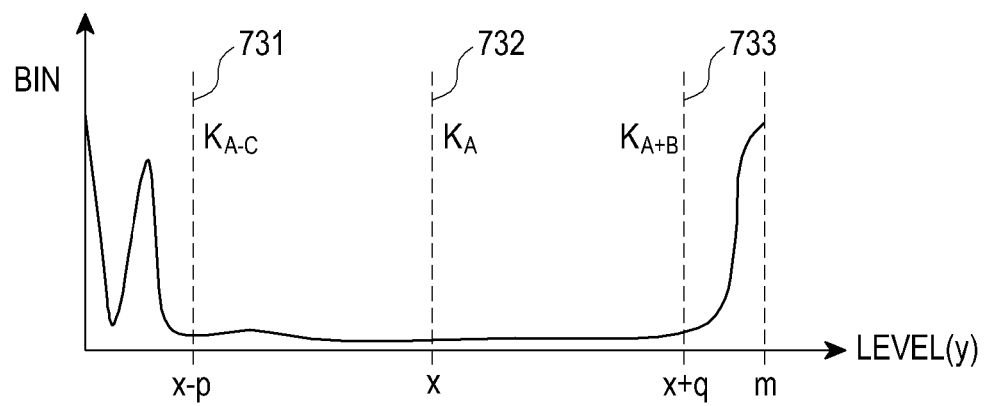
FIG. 17 is a graph illustrating a histogram distribution for explaining a method for determining a backlight environment according to another embodiment of the present invention.

In a backlight environment in which an excessively bright light source other than an object to be photographed is positioned behind the object, the histogram has a bisectional distribution of pixels in the low-key and the high key as illustrated in FIG. 17. Here, the control variable is greatly sharply changed, so that it is very difficult to control the brightness. Therefore, whether the backlight exists must be determined in step 1534.

The existence of the backlight is determined with reference to FIG. 17. The determination of the existence of the backlight uses level x 732 of $K_A$ in which a histogram accumulation value is A %, level x–p 73 of $K_{A-C}$ in which a histogram accumulation value is A–C %, and level x+p 733 of $K_{A+C}$ in which a histogram accumulation value is A+C %. That is to say, in order to determine the existence of the backlight, an interrelation between a brightness level satisfying a preset histogram accumulation value, a brightness level satisfying an accumulated value obtained by subtracting a first value from the preset histogram accumulation value, and a brightness level satisfying an accumulated value obtained by adding a first value to the preset histogram accumulation value is used. For example, in the event that the interrelation is defined as $K_A - K_{A-C} = p$, $K_{A+C} - K_A = q$, and $K_{A+C} - K_{A-C} = p+q$, when p, q, and p+q are larger than their thresholds, as a result of the comparison of p, q, and p+q with their thresholds, it may be recognized that the histogram has a bisectional distribution of pixels in the low-key and the high key. Therefore, the existence of the backlight is determined using the interrelation.

When the backlight is detected as a result of the determination, it proceeds to step 1576 to maintain the control variable value calculated just before the backlight is detected without a change of all of the setting values. However, when the backlight is not detected, it proceeds to step 1535. As such, by maintaining the control variable value in the backlight environment, it is possible to reduce errors in the brightness control caused by the backlight.

In step 1535, it is determined if the normalization value $K_A'$ is larger than the number $L_T$ of lower limit brightness pixel and is simultaneously less than the number $U_T$ of upper limit brightness pixels. To this end, after obtaining $K_A$ through Equation (9), the normalization value $K_A'$ is obtained through Equation (10) by using the obtained normalization value $K_A$. When the condition of step 1535 is satisfied, it is represented that the pixels are evenly distributed, so that the brightness is controlled so that the control brightness average Y is to be the reference brightness $Y_T$ in step 1540. Here, a brightness average $Y_C$ measured in the image means the brightness average $Y_A$ or the brightness average $Y_H$.

However, when the condition of step 1535 is not satisfied, it is determined if the normalization value $K_A'$ is less than the number $L_T$ of lower limit brightness pixels and is simultaneously less than the number $U_T$ of upper limit brightness pixels in step 1545. If the condition of step 1545 is satisfied, a relevant control variable is calculated so that $K_A$ is to be $L_T$. When the brightness $Y_C$ ($Y_A$ or $Y_H$) measured in the current image satisfies $Y_C < Y_{Lower}$, a control is made so that $K_A$ is to be $L_T$ in step 1561. If the brightness $Y_C$ satisfies $Y_C < Y_{Lower}$, a control is made so that Y becomes equal to $Y_{Lower}$, and the control variable is reset so that $K_A$ is to be $L_T$ in step 1555. That is, the control variable is reset so that the calculated control variable does not exceed the limitation value in step 1550. Even if the brightness average $Y_C$ measured in the image is included in the range of the desired brightness, there may occur the saturation and the dark photographing phenomenon, so that the control variable is adjusted in order to prevent the saturation and the dark photographing phenomenon.

If the condition of step 1545 is not satisfied, the relevant control variable is calculated so that $K_A$ is to be $U_T$ in step

1570. At this time, if the brightness $Y_C$ ($Y_A$ or $Y_H$) measured in the current image is larger than the upper limit brightness value $Y_{UPPER}$ in step 1580, a control is made so that $K_A$ is to be $U_T$ in step 1581. That is, $K_A$ is reduced to be the upper limit brightness value $Y_{UPPER}$ in order to prevent the brightness $Y_C$ measured in the current image from being excessively large. In contrast, when the brightness $Y_C$ measured in the current image is equal to or less than the upper limit brightness value $Y_{UPPER}$, a control is made so that the brightness average Y is to be $Y_{UPPER}$ and the control variable, which controls so that the $K_A$ is to be $U_T$, is reset in order to prevent the control variable from exceeding the limitation value in step 1575. Through performing the process, it is determined if the AE function for controlling the brightness is terminated in step 1585. If the AE function is not terminated, it returns to D of FIG. 15A and the aforementioned process is repetitively performed for an image input frame by frame.

In another embodiment of the present invention, the process for the brightness control using the brightness average has been described. However, in yet another another embodiment of the present invention, a process for the brightness control using a method of constantly maintaining the number of brightness levels of the histogram will be described.

Figure 18A:
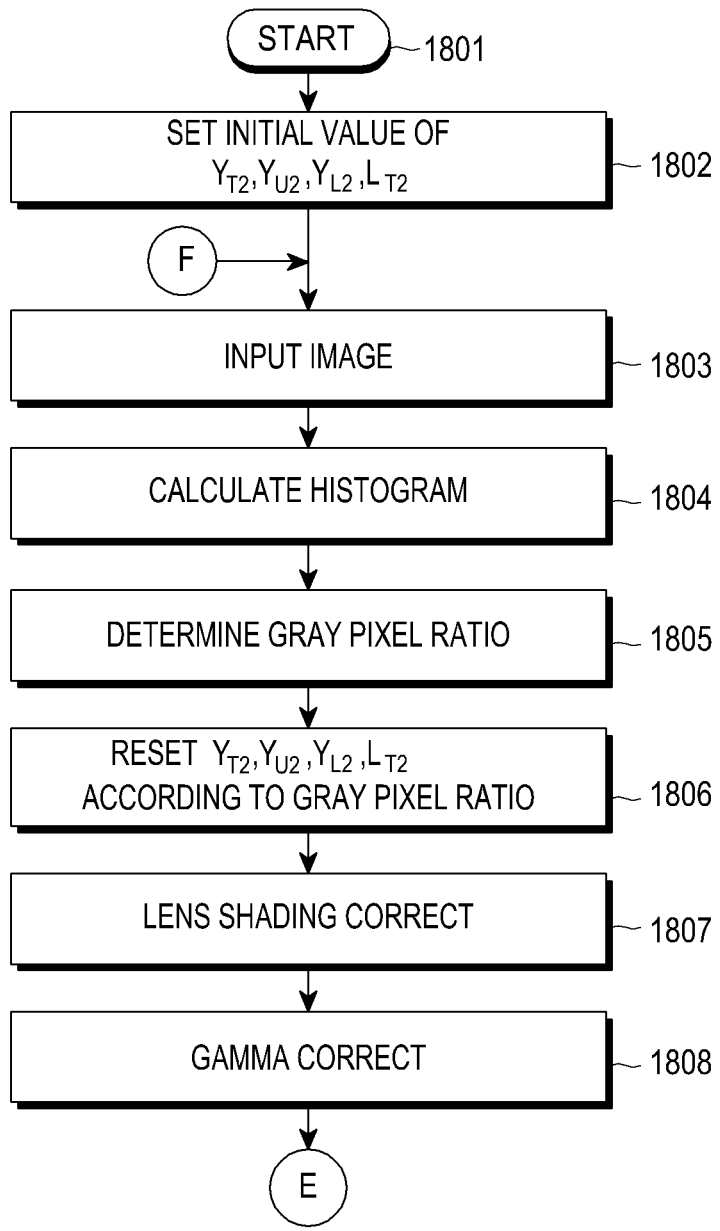
FIGS. 18A and 18B are flowcharts illustrating an operation of an automatic brightness control according to another embodiment of the present invention.

Referring to FIG. 18A, the processes for the auto brightness control according to yet another embodiment of the present invention is identical to those described in FIGS. 13A and 15A, except for the setting of the initial values in step 1802 and the reset of the variables in step 1806, so that those detailed description will be omitted. Symbol E is used in order to indicate that step 1808 of FIG. 18A is connected with step 1809 of FIG. 18B. Further, symbol F is used in order to indicate that step 1803 of FIG. 18A is connected with step 1815 of FIG. 18B.

In step 1802, variable $Y_{T2}$ is a target value of the brightness average control, variable $Y_{U2}$ is an upper limit restriction value of the brightness average control, variable $Y_{L2}$ is a lower limit restriction value of the brightness average control, and variable $L_{T2}$ is a brightness level of the histogram. Here, the $L_{T2}$ is a target level of an auto brightness control using the histogram. In order to prevent the brightness average from being excessively bright or dark in the process of the auto brightness control using the histogram, it is necessary to restrict the upper limit and the lower limit of the brightness.

Figure 18B:
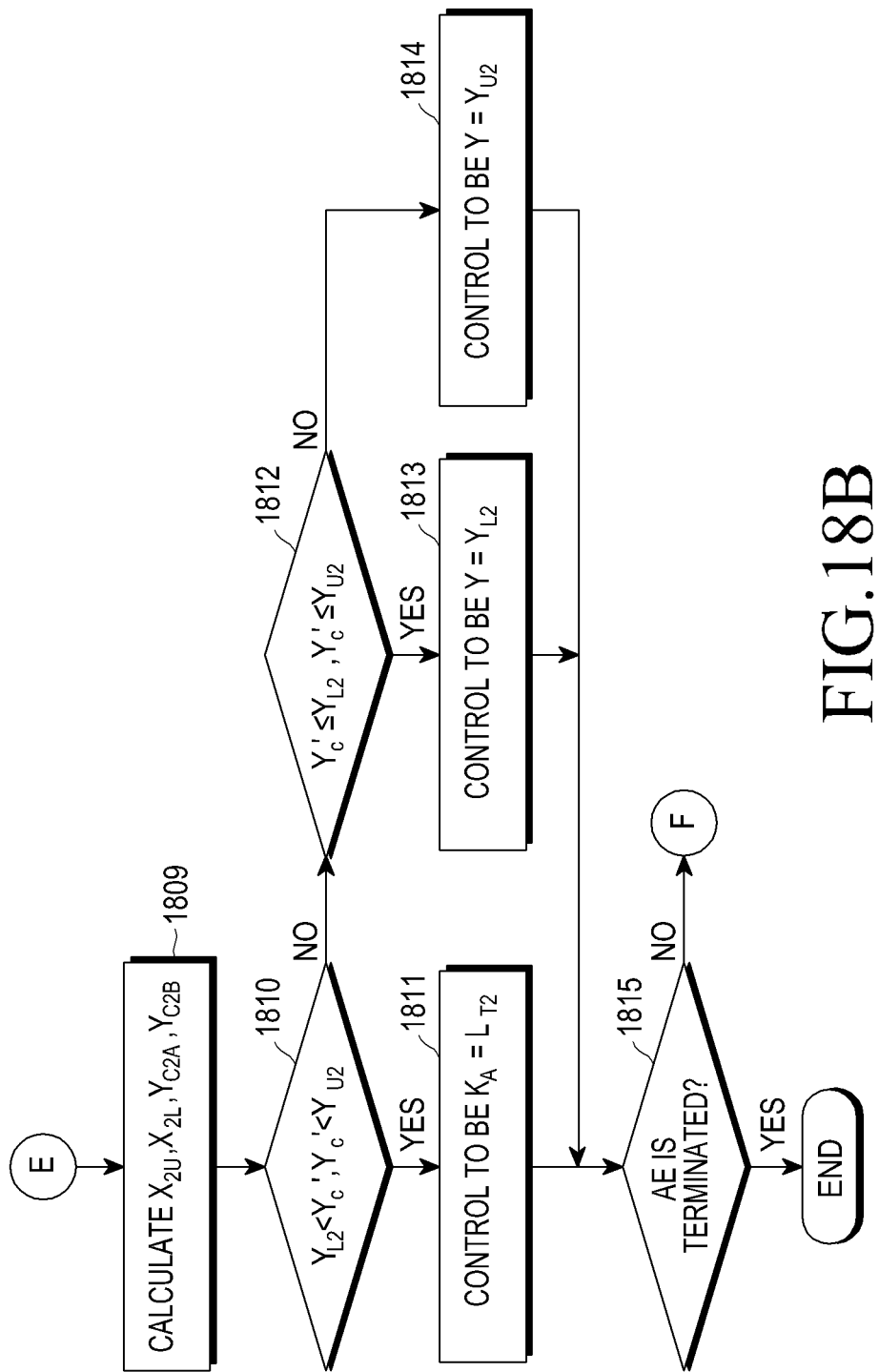

To this end, referring to FIG. 18B, control variables, $X_{2U}$, $X_{2L}$, $Y_{C2A}$, and $Y_{C2B}$ necessary for the auto brightness control are calculated, in step 1809.

In order to restrict the upper limit of the brightness among the control variables necessary for the auto brightness control, Equation (11) below is defined.

$$X_{2U} = L_T/K_A, \text{ or}$$

$$X_{2U} = (L_T - K_A) \times Rt_A + 1 \tag{11}$$

In Equation (11), variable $X_{2U}$ for the restriction of the upper limit of the brightness is used for the normalization of the brightness average, the $L_T$ is the number of lower limit brightness pixels, the $K_A$ is a value of a ratio % of the sum of the number of pixels from level 0 to level LE with respect to the entire pixels.

If the brightness average is uniformly constantly maintained in the brightness upper limit indicated by reference number 721 of FIG. 16 in the histogram of FIG. 16, the LE in the $K_A$ is changed, and a variable $X_{2U}$ to be used for the normalization of the brightness average by using the changed value is defined as Equation (11). In Equation (4), $Rt_A$ is a user defined constant for scaling "$L_T$-$K_A$".

$$Y_{C2A} = Y_C \times X_{2U} \tag{12}$$

In Equation (12), $Y_{C2A}$ is a normalization value of the measured brightness average YC and is obtained by substituting $X_{2U}$ defined in Equation (11).

Further, it is necessary to restrict the lower limit of the brightness in order to prevent the brightness average from being excessively dark in the process of the auto brightness control using the histogram.

In order to restrict the lower limit of the brightness, Equation (13) may be used:

$$X_{2L} = L_T/K_A, \text{ or}$$

$$X_{2L} = (L_T - K_A) \times Rt_B + 1 \tag{13}$$

In Equation (13), the variable $X_{2L}$ for the restriction of the lower limit of the brightness is used for the normalization of the brightness average. The variable $X_{2L}$ is defined likewise to Equations (11) and (12), and $Rt_B$ is a user defined constant for scaling "$L_T$-$K_A$". However, here, the variable $X_{2L}$ of Equation (13) is continuously changed within a range of $K_A \leq L_T$, but there occurs a case in which the change of the $X_{2L}$ is restricted because $K_A$ cannot be larger than $L_T$.

In order to overcome the restriction, when the brightness average indicated by reference number 721 of FIG. 16 is constantly maintained in the brightness lower limit, the LE obtained in obtaining $K_A$ by using the histogram may be fixed to the maximum brightness level m. Here, even if $K_A$ is equal to m, the bin larger than $L_{T2}$ increases. Therefore, by defining a frequency function $H_{A2}$ of an area $L_{T2}$ to m as Equation (14) below, it is possible to continuously change the control variable.

$$H_{A2} = \int_{T2}^{m} f(y) dy / \int_{0}^{m} f(y) dy \tag{14}$$

In Equation (14), a ratio of the sum of the number of pixels from level $L_{T2}$ to level m with respect to the sum of the number of pixels from level 0 to level m in the histogram f(y) is defined as a frequency function $H_{A2}$ in the area $L_{T2}$ to m. It is characterized in that the frequency function $H_{A2}$ increases when the bin of the brightness pixel is increased.

$$X_{2L} = (1-H_{A2})/(\text{"}A\text{" used for definition of } K_A) \text{ or}$$

$$X_{2L} = (1-H_{A2})-A) \times Rt_C + 1 \tag{15}$$

In Equation (15), likewise to Equation (13), the variable $X_{2L}$ for the restriction of the lower limit of the brightness is used for the normalization of the brightness average, and $Rt_C$ is a user defined constant for scaling "$(1-H_{A2})-A$". However, in Equation (15), $(1-H_{A2})$ is used because when $K_A$ becomes $L_T$, $H_{A2}$ is 1-A.

When the lower limit is restricted, the method of the normalization is as follows.

$$Y_{C2B} = Y_C \times X_{2L} \tag{16}$$

In Equation (16), $Y_{C2B}$ is a normalized value of the measured brightness value $Y_C$, and is obtained by substituting $X_{2L}$ defined in Equation (15).

In the event that the brightness control variable $Y_C$ is normalized to $Y_C{'}$ by using the $X_{2L}$ used in Equations (13) and (16), it may be expressed by Equation (17) below.

$$\begin{aligned} Y_c' &= Y_{C2A} \quad \text{---} L_T/K_A \times Y_C > Y_{U2} \times Rt_D \\ &= Y_{C2B} \quad \text{---} L_T/K_A \times Y_C < Y_{L2} \times Rt_E \\ &= Y_C \quad \text{---the rest cases} \end{aligned} \tag{17}$$

In Equation (17), $Rt_D$ and $Rt_E$ may be defined by a user in accordance with a size of $Y_C$, and a condition of $Rt_D = Rt_E = 1$ is generally used. If $Rt_D \neq 1$ or $Rt_E \neq 1$ it means the change of the conversion area of the $Y_C$ by the user.

Through the aforementioned process, the control variable necessary for the auto brightness control is calculated in step 1809 of FIG. 17B. When a ratio (%) of the number of brightness levels of the histogram is constantly maintained, it is determined if the normalized brightness average $Y_C'$ of the weighted average brightness average that is currently measured is included between the defined $Y_{L2}$ and $Y_{U2}$ in step 1810. When the brightness average $Y_C'$ is included between the defined $Y_{L2}$ and $Y_{U2}$, a control is made so that $K_A$ is to be $L_{T2}$ by using the histogram distribution in step 1811. However, when the brightness average $Y_C'$ is beyond such a range, i.e. the brightness average $Y_C'$ is not included between the defined $Y_{L2}$ and $Y_{U2}$, it proceeds to step 1812.

When $Y_c' \leq Y_{L2}$ and $Y_c' \leq Y_{U2}$ in step 1812, it proceeds to step 1813 to adjust the brightness average target Y to be the $Y_{L2}$. However, in the event of the contrary case, for example, when the condition of $Y_c' \geq Y_{L2}$ and $Y_c' \geq Y_{U2}$ is satisfied, it proceeds to step 1814 to adjust the brightness average target Y to be the $Y_{U2}$. If the AE function is not terminated, it returns to symbol F of FIG. 18A, to repetitively perform the aforementioned process for an image input frame by frame.

Figure 19:
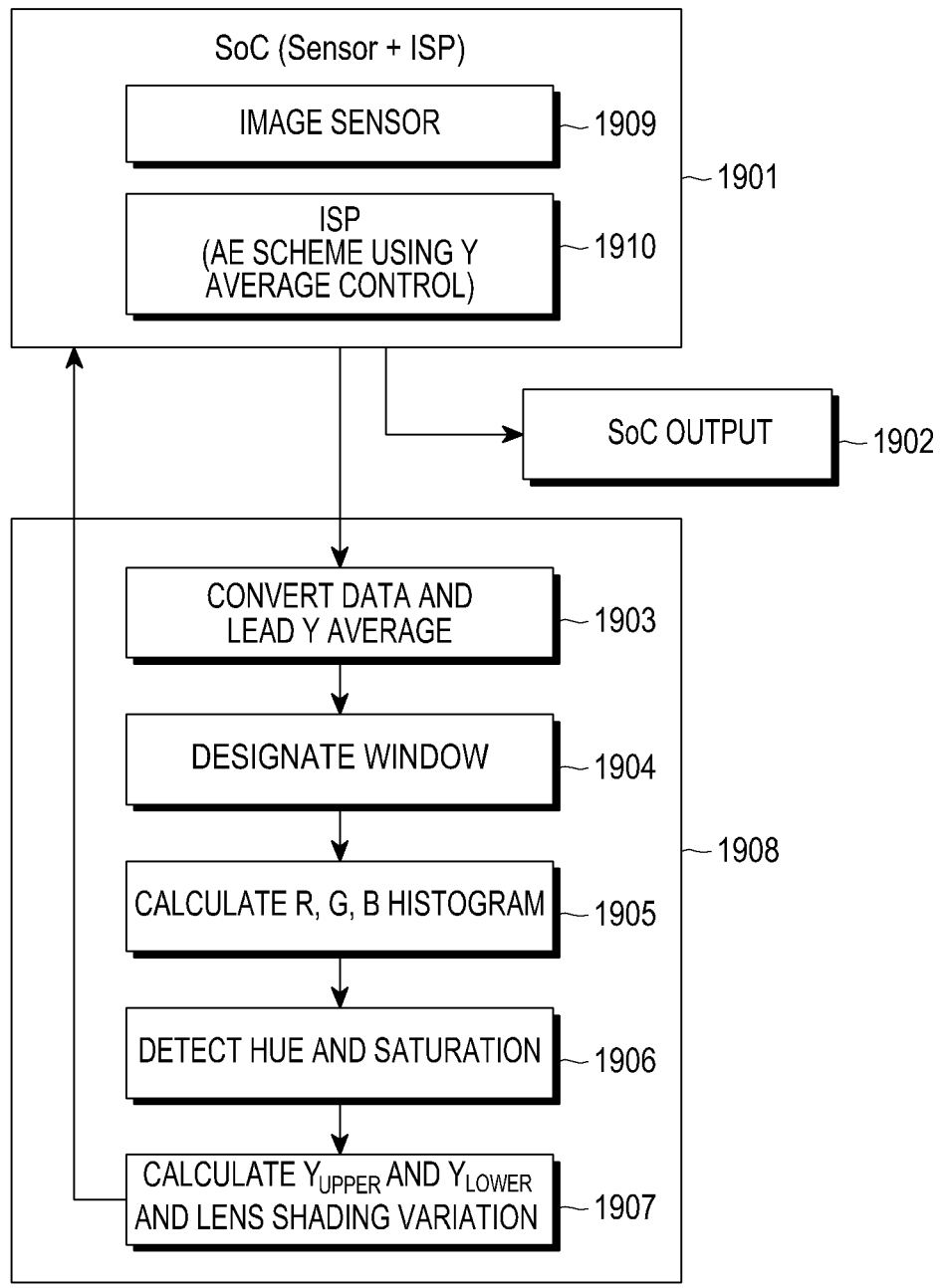
FIGS. 19 and 20 are block diagrams illustrating an inside of an image photographing device of FIG. 1 according to another embodiment of the present invention.
Figure 20:
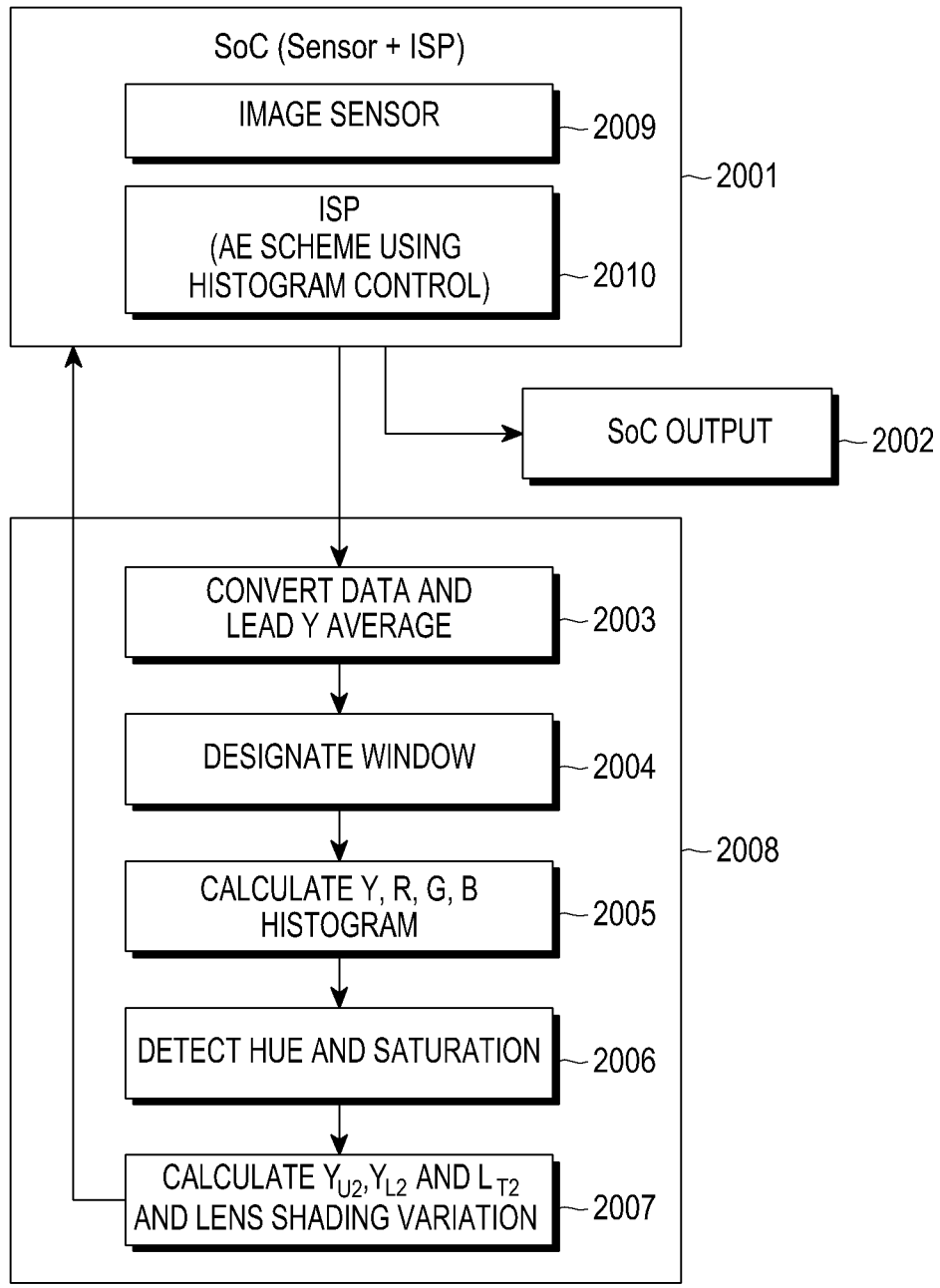

FIGS. 19 and 20 are other diagrams illustrating an inside of the image photographing device of FIG. 1, and illustrate the examples of the construction in which an operation algorithm of FIGS. 15A and 15B and FIGS. 18A and 18B cannot be constructed into a single hardware component as illustrated in FIG. 1.

It is possible to apply the brightness average algorithm suggested in the present invention to the System on a Chip (SoC) type in which an image sensor is integrally formed with In System Programming (ISP). Here, the brightness control algorithm is contained on the ISP. As illustrated in FIGS. 19 and 20, by constructing the SoC 1901 or 2001 with the integration of the image sensor 1909 or 2009 and the ISP 1910 or 2010, it is possible to implement the brightness average algorithm.

FIG. 19 illustrates an example of the image photographing device implementing the brightness average algorithm by independently connecting the SoC 1901 with elements performing the histogram calculation and the detection of the hue and saturation. FIG. 20 illustrates an example of the image photographing device implementing the brightness average algorithm by independently connecting the SoC 1901 with elements performing the detection of the brightness, hue, and saturation.

First, when it is assumed that the brightness average algorism of the ISP 1910 is the auto brightness control scheme using the Y average control in FIG. 19, the image sensor 1909 corresponds to the image sensor 100 of FIG. 1 and the remaining elements of FIG. 1 may be implemented in a form of the ISP 1910. However, the elements, such as the histogram calculator 120 and the hue and saturation determination unit 140 correspond to an element indicated by reference number 1908 of FIG. 19.

The data is converted and the Y average is led for an output of the SoC 1901 of the image photographing device having the above construction in step 1903. In particular, if the output of the SoC 1901 is compressed data, a decompression is performed, and when the decompressed data is YUV data, the data is converted into RGB data. Further, if the output of the SoC 1901 is YUV data, the data is directly converted to the RGB data. When the window is designated for the converted RGB data as illustrated in FIG. 3 in step 1904, the histogram for each window is obtained in step 1905. After detecting the hue and the saturation identically to FIG. 1 in step 1906, the upper limit brightness value $Y_{UPPER}$, the lower limit brightness variable $Y_{LOWER}$, and the lens shading variation quantity are calculated and the calculated $Y_{UPPER}$, $Y_{LOWER}$, and the lens shading variation quantity feed back to the SoC 1101, so that it is possible to implement the auto brightness control according to another embodiment of the present invention.

The elements and their operations in FIG. 20 are similar to those of FIG. 19. However, it is different in that when the ISP 2010 of the SoC 2001 of FIG. 20 provides the AE scheme using the histogram control, Y, R, G, B averages for each window are obtained in step 2005 and the $Y_{U2}$, the $Y_{L2}$, the $L_{T2}$, and the lens shading variation quantity are calculated in step 2007. The calculated values are fed back to the SoC 2001 so that it is possible to implement the auto brightness control according to another embodiment of the present invention.

As described above, it is advantageous to prevent the saturation and the dark photographing generated in using the brightness data, effectively improving the AWB performance, as well as improve the quality of the still image and the moving image.

While the present invention has been shown and described with reference to certain embodiments and drawings thereof, it will be understood by those skilled in the art that various changes in form and detail may be made therein without departing from the spirit and scope of the invention as defined by the appended claims.

What is claimed is:

1. A method for automatically controlling image brightness in an image photographing device, the method comprising:
   calculating a histogram for an input image;
   obtaining a brightness average for the histogram;
   determining if a number of pixels of a histogram distribution within a first brightness level range is included within a preset first range and if a number of pixels of a histogram distribution within a second brightness level range is included within a preset second range; and
   adjusting the brightness average to be a reference brightness when the number of pixels of the histogram distribution within the first brightness level range is included within the preset first range and when the number of pixels of the histogram distribution within the second brightness level range is included within the preset second range.

2. The method as claimed in claim 1, further comprising setting an initial value for each of a user set reference brightness, the reference brightness, an upper limit brightness level variable, a lower limit brightness level variable, a number of lower limit brightness pixels, a number of upper limit brightness pixels, and a maximum brightness level.

3. The method as claimed in claim 2, further comprising:
   dividing the input image into multiple windows prior to calculating the histogram;
   obtaining the brightness average by using brightness data and a weight of each of the windows; and
   adjusting the brightness average using the weight of each of the windows to be the reference brightness.

4. The method as claimed in claim 1, wherein obtaining the brightness average for the histogram comprises:
   obtaining a sum of histogram bins in which a weight is applied to each of the windows divided from the image; and
   obtaining the brightness average for the histogram by using the sum of the histogram bins and a level.

5. The method as claimed in claim 2, wherein the number of pixels of the histogram distribution within the first brightness level range is a number of brightness pixels between the lower limit brightness level variable and the upper limit brightness level variable, and the number of pixels of the histogram distribution within the second brightness level range is a number of brightness pixels between the upper limit brightness level variable and the maximum brightness level.

6. The method as claimed in claim 3, further comprising:
obtaining a brightness level at which a total number of pixels of the calculated histogram is maintained as a preset number of pixels; and
performing a normalization by using the brightness average, the obtained brightness level, the user set reference brightness, and the weight for each window.

7. The method as claimed in claim 6, further comprising determining if a backlight for the image exists.

8. The method as claimed in claim 7, further comprising:
determining if a normalized value is greater than the number of lower limit brightness pixels and less than the number of upper limit brightness pixels when the backlight for the image does not exist; and
adjusting the brightness average to be the reference brightness when the normalized value is greater than the number of lower limit brightness pixels and less than the number of upper limit brightness pixels.

9. The method as claimed in claim 8, further comprising, adjusting the obtained brightness level to be the number of lower limit brightness pixels when the normalized value is less than the number of lower limit brightness pixels and the number of upper limit brightness pixels.

10. The method as claimed in claim 8, further comprising, adjusting the obtained brightness level to be the number of upper limit brightness pixels when the normalized value is greater than the number of lower limit brightness pixels and the number of upper limit brightness pixels.

11. The method as claimed in claim 1, further comprising:
determining a gray ratio and a monochrome property of the image; and
performing a lens shading correction in accordance with the determined monochrome property.

12. The method as claimed in claim 11, further comprising resetting a lower limit brightness level variable, an upper limit brightness level variable, a number of lower limit brightness pixels, and a number of upper limit brightness pixels.

13. An image photographing apparatus for automatically controlling a brightness, the image photographing apparatus comprising:
an image sensor for receiving an input image;
a histogram calculator for calculating a histogram for the image received from the image sensor, obtaining a brightness average for the histogram, and determining if a number of pixels of a histogram distribution within a first brightness level range is included within a preset first range and if a number of pixels of a histogram distribution within a second brightness level range is included within a preset second range; and
an auto brightness controller for adjusting the brightness average to be a reference brightness when the number of pixels of the histogram distribution within the first brightness level range is included within the preset first range and when the number of pixels of the histogram distribution within the second brightness level range is included within the preset second range.

14. The image photographing apparatus as claimed in claim 13, wherein the histogram calculator divides the input image into multiple windows and obtains the brightness average by using brightness data and a weight of each of the windows.

15. The image photographing apparatus as claimed in claim 14, wherein the auto brightness controller adjusts the brightness average obtained by the histogram calculator to be the reference brightness.

16. The image photographing apparatus as claimed in claim 13, wherein the histogram calculator obtains a sum of histogram bins in which a weight is applied to each of the windows divided from the image, and then obtains the brightness average for the histogram by using the sum of the histogram bins and a level.

17. The image photographing apparatus as claimed in claim 13, wherein the number of pixels of the histogram distribution within the first brightness level range is a number of brightness pixels between the lower limit brightness level variable and the upper limit brightness level variable, and the number of pixels of the histogram distribution within the second brightness level range is a number of brightness pixels between the upper limit brightness level variable and the maximum brightness level.

18. The image photographing apparatus as claimed in claim 13, wherein the histogram calculator obtains a brightness level at which a total number of pixels of the calculated histogram is maintained as a preset number of pixels and then performs a normalization by using the brightness average, the obtained brightness level, the user set reference brightness, and the weight for each window.

19. The image photographing apparatus as claimed in claim 18, wherein the auto brightness controller determines if a backlight for the image exists, and when the backlight does not exist, the auto brightness controller determines if a normalized value is greater than the number of lower limit brightness pixels and less than the number of upper limit brightness pixels, and when a normalized value is greater than the lower limit brightness level and less than the upper limit brightness level, the auto brightness controller adjusts the brightness average to be the reference brightness.

20. The image photographing apparatus as claimed in claim 13, further comprising:
a hue/saturation determination unit for determining a gray ratio and a monochrome property of the image;
a lens shading corrector for performing a lens shading correction in accordance with the determined monochrome property; and
a gamma corrector for adjusting the brightness through changing an offset point and a highlight point according to the histogram distribution.

* * * * *